(12) United States Patent
Azami et al.

(10) Patent No.: US 9,294,709 B2
(45) Date of Patent: Mar. 22, 2016

(54) IMAGING DEVICE, IMAGE PROCESSING DEVICE, IMAGING METHOD, IMAGE PROCESSING METHOD, AND COMPUTER PROGRAM PRODUCT

(71) Applicant: JVC KENWOOD Corporation, Yokohama (JP)

(72) Inventors: Tomohiro Azami, Yokohama (JP); Jiro Uzaki, Miura-gun (JP); Akiyoshi Jin, Yokohama (JP); Takeshi Kuchinomachi, Hiratsuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 104 days.

(21) Appl. No.: 14/038,544

(22) Filed: Sep. 26, 2013

(65) Prior Publication Data

US 2014/0085506 A1 Mar. 27, 2014

(30) Foreign Application Priority Data

Sep. 27, 2012 (JP) .................................. 2012-214277
Sep. 27, 2012 (JP) .................................. 2012-214280
Jun. 5, 2013 (JP) .................................. 2013-118896
Jun. 28, 2013 (JP) .................................. 2013-136122

(51) Int. Cl.
*H04N 5/77* (2006.01)
*G11B 27/32* (2006.01)
*G11B 27/031* (2006.01)

(52) U.S. Cl.
CPC .............. *H04N 5/772* (2013.01); *G11B 27/031* (2013.01); *G11B 27/322* (2013.01); *G11B 27/327* (2013.01)

(58) Field of Classification Search
CPC .  H04N 5/772; H04N 5/23293; G11B 27/031; G11B 27/322; G11B 27/327
USPC ........ 348/231.2, 231.5, 333.02, 584; 386/278
See application file for complete search history.

(56) References Cited

U.S. PATENT DOCUMENTS

2006/0245721 A1* 11/2006 Moriya et al. ................... 386/46
2012/0320248 A1* 12/2012 Igarashi ................... 348/333.01
2014/0079368 A1* 3/2014 Sasaki et al. .................. 386/207

FOREIGN PATENT DOCUMENTS

EP        1 906 406 A1    4/2008
JP        10-013773       1/1998
JP        2008-005010     1/2008

OTHER PUBLICATIONS

European Search Report in European Patent Application No. 13020109.8, dated Feb. 28, 2014.

* cited by examiner

*Primary Examiner* — Nhan T Tran
(74) *Attorney, Agent, or Firm* — Venable LLP; Michael A. Sartori; Todd R. Farnsworth

(57) ABSTRACT

An imaging device includes: an imaging unit that images an event and generates imaged data of the event; a storage unit that stores the imaged data of the event as a plurality of moving image files; a marker input unit that inputs at least a start marker representing a start of the event and an end marker representing an end of the event; and a control unit that causes marker data including the input start marker and end marker to be stored in the storage unit as a plurality of marker data files in association with the plurality of moving image files.

8 Claims, 27 Drawing Sheets

MARKER TYPE TABLE

| MARKER ID | MARKER |
|---|---|
| 10 | GAME START |
| 20 | GAME END |
| 30 | SCORE |
| 40 | CHECK |
| 50 | SMILE |
| 60 | GOOD |

FIG.5

TEAM TABLE

| TEAM ID | TEAM NAME | TEAM COLOR | PLAYER NAME |
|---|---|---|---|
| 1 | OOO STARS | BLUE | SUZUKI, TANAKA, ⋯ |
| 2 | △△△ CLUB | WHITE | ⋯ |
| 3 | YOKOHAMA XXX | RED | ⋯ |
| ⋮ | ⋮ | ⋮ | ⋮ |

FIG.6

MARKER DATA FILE

| MARKER ID | INPUT TIME [ms] | TEAM ID | SCORE |
|---|---|---|---|
| 10 | 8521 | 1, 2 | − |
| 30 | 13344 | 1 | 2 |
| 30 | 941253 | 1 | 3 |
| 50 | 1333675 | − | − |
| 40 | 2942147 | − | − |
| 20 | 3693041 | − | − |
| ⋮ | ⋮ | ⋮ | ⋮ |

GAME DATA FILE

| GAME NAME | GAME DATE AND TIME | TEAM ID | FILE NAME |
|---|---|---|---|
| NEWCOMER GAME | 2012.04.15 10:00 – 13:30 | 1, 2 | 00000.MTS |
| FINAL | 2012.05.01 13:00 – 16:30 | 1, 3 | 00001.MTS |
| SCRIMMAGE | 2012.08.20 14:21 – 16:01 | 3, 5 | 00002.MTS |
| ⋮ | ⋮ | ⋮ | ⋮ |

INPUT MARKER

REC  START  LAP   LAP   LAP   END              START   LAP       END t0    t1    t2    t3    t4    t5               t6      t7        t8

INPUT TIME

MARKER DATA FILE

| MARKER ID | INPUT TIME [ms] | SPLIT TIME | LAP TIME |
|---|---|---|---|
| 10 | 102201 [t1] | – | – |
| 11 | 702633 [t2] | 0:10'00"43 | 0:10'00"43 |
| 11 | 1301253 [t3] | 0:19'59"05 | 0:09'58"62 |
| 11 | 1908675 [t4] | 0:30'06"47 | 0:10'07"42 |
| 20 | 2513147 [t5] | 0:40'10"94 | 0:10'04"47 |
| 10 | 4215223 [t6] | – | – |
| 11 | 4820119 [t7] | 0:10'04"90 | 0:10'04"90 |
| ⋮ | ⋮ | ⋮ | ⋮ |
| 20 | 6620788 [t8] | 0:40'05"57 | 0:10'01"40 |
| ⋮ | ⋮ | ⋮ | ⋮ |

IMAGING DEVICE, IMAGE PROCESSING DEVICE, IMAGING METHOD, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2012-214277, filed on Sep. 27, 2012, Japanese Patent Application No. 2012-214280, filed on Sep. 27, 2012 and Japanese Patent Application No. 2013-118896, filed on Jun. 5, 2013 and Japanese Patent Application No. 2013-136122, filed on Jun. 28, 2013 the entire contents of which are incorporated herein by reference.

BACKGROUND OF THE INVENTION

1. Field of the Invention

The present invention relates to an imaging device, an image processing device, an imaging method, an image processing method, and a computer program product.

2. Description of the Related Art

There have been known techniques in which when a moving image or a still image is imaged using an imaging device such as a video camera, a user automatically or manually adds a tag used to identify or search for an imaged image to imaged image data. The user can easily organize or search for the imaged image data using a tag.

For example, Japanese Laid-open Patent Publication No. 10-13773 discloses a digital image management retrieval system capable of adding and displaying a moving image index corresponding to time axis data representing a start position of a leading image of each scene in a moving image file.

However, when a single event (for example, a game or a match) is recorded throughout a plurality of moving image files, the user needs to find and understand a period of time (for example, a start position and an end position of an event) of the event from the plurality of moving image files when managing the moving images of the event. For this reason, there is a problem in that it takes time and efforts to manage moving image files.

Further, in the technique disclosed in Japanese Laid-open Patent Publication No. 10-13773, an index is added to a leading image of each scene in a single moving image file. However, management of indices when a single event is recorded through a plurality of moving image files is not disclosed.

The present invention has been made in light of the foregoing, and it is desirable to provide an imaging device, an imaging method, and an imaging program, which are capable of easily managing a moving image file even when a single event is recorded throughout a plurality of moving image files.

SUMMARY OF THE INVENTION

It is an object of the present invention to at least partially solve the problems in the conventional technology.

According to an aspect of the present invention, an imaging device includes: an imaging unit that images an event and generates imaged data of the event; a storage unit that stores the imaged data of the event as a plurality of moving image files; a marker input unit that inputs at least a start marker representing a start of the event and an end marker representing an end of the event; and a control unit that causes marker data including the input start marker and end marker to be stored in the storage unit as a plurality of marker data files in association with the plurality of moving image files.

According to another aspect of the present invention, an imaging method includes: imaging an event and generating imaged data of the event; storing the imaged data of the event as a plurality of moving image files in a storage unit; inputting at least a start marker representing a start of the event and an end marker representing an end of the event; and causing marker data including the input start marker and end marker to be stored in the storage unit as a plurality of marker data files in association with the plurality of moving image files.

According to still another aspect of the present invention, a computer program product including a non-transitory computer usable medium having computer readable program that causes a computer to execute: an imaging program that causes a computer to execute: imaging an event and generating imaged data of the event; storing the imaged data of the event as a plurality of moving image files in a storage unit; inputting at least a start marker representing a start of the event and an end marker representing an end of the event; and causing marker data including the input start marker and end marker to be stored in the storage unit as a plurality of marker data files in association with the plurality of moving image files.

According to still another aspect of the present invention, an imaging device that is connected with a mobile terminal device via a communication line, the mobile terminal device including a marker input unit that inputs a marker representing that a player has passed through a predetermined point to a moving image and a measuring unit that measures a time, the imaging device includes: an imaging unit that generates imaged data of a moving image through an imaging process; a storage unit that stores the imaged data as a moving image file; a receiving unit that receives an input instruction of inputting the marker to the moving image file and time information related to the time measured by the measuring unit from the mobile terminal device; a control unit that generates marker data such that the marker corresponding to the input instruction for inputting the marker, a time at which the marker is input, and the time information are associated with one another, and stores the marker data in the storage unit in association with the moving image file; an operating unit that selects the marker data; and a playback unit that plays back the moving image file from a time which is traced back from a time at which the marker of the marker data selected by an operation of the operating unit is input by a time corresponding to the time information associated with the marker.

According to still another aspect of the present invention, an imaging method of an imaging device that is connected with a mobile terminal device via a communication line, the mobile terminal device including a marker input unit that inputs a marker representing that a player has passed through a predetermined point to a moving image and a measuring unit that measures a time, the imaging method includes: generating imaged data of a moving image through an imaging process; storing the imaged data as a moving image file in a storage unit; receiving an input instruction of inputting the marker to the moving image file and time information related to the time measured by the measuring unit from the mobile terminal device; generating marker data such that the marker corresponding to the input instruction for inputting the marker, a time at which the marker is input, and the time information are associated with one another, and storing the marker data in the storage unit in association with the moving image file; selecting the marker data; and playing back the moving image file from a time which is traced back from a time at which the marker of the selected marker data is input by a time corresponding to the time information associated with the marker.

According to still another aspect of the present invention, an imaging system includes: a mobile terminal device; and an imaging device connected with the mobile terminal device via a communication line, and the mobile terminal device includes a measuring unit that measures a time, a marker input unit that inputs a marker representing that a player has passed through a predetermined point to a moving image, and a transmitting unit that transmits an input instruction of the marker and time information related to the time measured by the measuring unit to the imaging device in association with each other according to an operation of the marker input unit, and the imaging device includes an imaging unit that generates imaged data of a moving image through an imaging process, a storage unit that stores the imaged data as a moving image file, a receiving unit that receives an input instruction of inputting the marker to the moving image file and the time information from the mobile terminal device, a control unit that generates marker data such that the marker corresponding to the input instruction for inputting the marker, a time at which the marker is input, and the time information are associated with one another, and stores the marker data in the storage unit in association with the moving image file, an operating unit that selects the marker data, and a playback unit that plays back the moving image file from a time which is traced back from a time at which the marker of the marker data selected by an operation of the operating unit is input by a time corresponding to the time information associated with the marker.

According to still another aspect of the present invention, an imaging device includes: an imaging unit that images an event and generates imaged data of the event; a marker input unit that inputs a marker representing a state of the event to the moving image; a first codec that encodes image data corresponding to the marker input by the marker input unit to be superimposed on the imaged data, and generates a first moving image file; a second codec that encodes the imaged data, and generates a second moving image file; a storage unit that stores the second moving image file; and a control unit that generates marker data such that the marker input by the marker input unit is associated with a time at which the marker is input, and causes the marker data to be stored in the storage unit in association with the second moving image file.

According to still another aspect of the present invention, an imaging method includes: imaging an event and generates imaged data of the event; inputting a marker representing a state of the event to the moving image; encoding image data corresponding to the input marker to be superimposed on the imaged data, and generating a first moving image file; encoding the imaged data, and generating a second moving image file; storing the second moving image file in a storage unit; and generating marker data such that the input marker is associated with a time at which the marker is input, and causing the marker data to be stored in the storage unit in association with the second moving image file.

According to still another aspect of the present invention, an image processing device includes: an imaged data storage unit that stores imaged data of a moving image obtained by an imaging process; a marker storage unit that stores a marker displayed during a playback of the moving image in association with input time information representing a timing at which the marker is input by a user; a display time setting unit that sets display time information representing a timing at which the marker is displayed to a timing different from the timing represented by the input time information; and a display image data generating unit that generates display image data used to display the moving image together with the marker based on the display time information.

According to still another aspect of the present invention, an image processing device includes: an imaged data storage unit that stores imaged data of a moving image obtained by an imaging process; a marker storage unit that stores a marker displayed during a playback of the moving image in association with input time information representing a timing at which the marker is input by the user and input state information representing a state in which the marker is input by the user; a display time setting unit that sets display time information representing a timing at which the marker is displayed to a timing different from the timing represented by the input time information; a display image data generating unit that generates display image data used to display the moving image together with the marker based on the display time information; and an input time changing unit that generates the input time information at a timing according to the input state information when the display image data generating unit generates the display image data.

According to still another aspect of the present invention, an imaging device includes: an imaging unit that generates imaged data of a moving image through an imaging process; an imaged data storage unit that stores the imaged data; a marker storage unit that stores a marker displayed during a playback of the moving image in association with input time information representing a timing at which the marker is input by the user; a display time setting unit that sets display time information representing a timing at which the marker is displayed to a timing different from the timing represented by the input time information; and a display image data generating unit that generates display image data used to display the moving image together with the marker based on the display time information.

According to still another aspect of the present invention, an image processing method includes: storing imaged data of a moving image obtained by an imaging process in an imaged data storage unit; storing a marker displayed during a playback of the moving image in a marker storage unit in association with input time information representing a timing at which the marker is input by the user; setting display time information representing a timing at which the marker is displayed to a timing different from the timing represented by the input time information; and generating display image data used to display the moving image together with the marker based on the display time information.

According to still another aspect of the present invention, an imaging method includes: generating imaged data of a moving image through an imaging process; storing the imaged data in an imaged data storage unit; storing a marker displayed during a playback of the moving image in a marker storage unit in association with input time information representing a timing at which the marker is input by the user; setting display time information representing a timing at which the marker is displayed to a timing different from the timing represented by the input time information; and generating display image data used to display the moving image together with the marker based on the display time information.

According to still another aspect of the present invention, an computer program product including a non-transitory computer usable medium having a computer readable program that causes a computer to execute: storing imaged data of a moving image obtained by an imaging process in an imaged data storage unit; storing a marker displayed during a playback of the moving image in a marker storage unit in association with input time information representing a timing at which the marker is input by the user; setting display time information representing a timing at which the marker is displayed to a timing different from the timing represented by the input time information; and generating display image data used to display the moving image together with the marker based on the display time information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 illustrates a team table according to the first embodiment;

FIG. 6 illustrates a marker data file according to the first embodiment;

DETAILED DESCRIPTION OF THE PREFERRED EMBODIMENTS

First Embodiment

Figure 1:
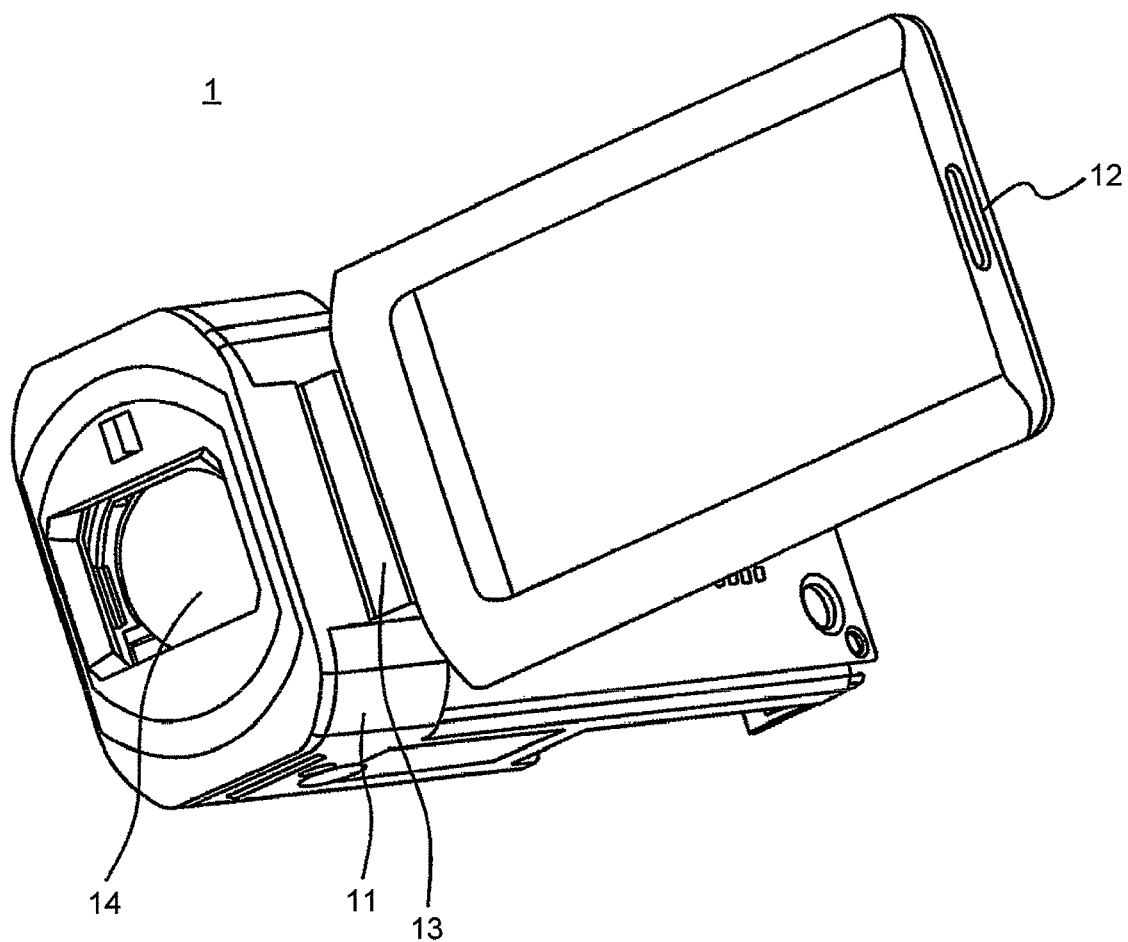
FIG. 1 is a perspective view illustrating an external appearance of an imaging device according to a first embodiment.

Hereinafter, exemplary embodiments of the present invention will be described with reference to the accompanying drawings. FIG. 1 is a diagram illustrating an external appearance of an imaging device 1 according to a first embodiment. The imaging device 1 includes a body unit 11, a monitor unit 12, a hinge 13, and a lens 14 as illustrated in FIG. 1. The lens 14 is disposed in the front end of the body unit 11. Further, FIG. 1 is a perspective view illustrating a state in which the monitor unit 12 is opened.

External Configuration of Imaging Device 1

The body unit 11 is a housing that stores a lens unit including a plurality of lenses, an imaging element, a battery, a Wi-Fi module (not illustrated), and the like. The imaging device 1 can image a still image and a moving image using a lens unit and an imaging element for imaging an image.

Further, the monitor unit 12 is disposed on the left side surface of the body unit 11. The monitor unit 12 is connected with the body unit 11 via the hinge 13. For example, the monitor unit 12 includes a liquid crystal monitor that displays a subject, stored image data, setting information, and other information. For example, when the user opens the monitor unit 12 in order to perform imaging, power is turned on. Further, when the monitor unit 12 has a touch panel function, the liquid crystal monitor of the monitor unit 12 functions as a part of an operating unit.

In the state in which the monitor unit 12 is opened, the liquid crystal monitor of the monitor unit 12 is arranged toward the rear side, that is, toward a direction opposite to an aperture direction of a lens barrel. The monitor unit 12 is rotatably connected to the body unit 11 in the state in which the monitor unit 12 is opened. As the monitor unit 12 is rotated, the direction of the liquid crystal monitor changes from the rear side to the front side (the aperture direction of the lens barrel).

Further, the shape or configuration of the imaging device 1 according to the present invention is not particularly limited as long as the imaging device 1 can image a still image or a moving image, and includes a display unit such as a liquid crystal monitor. In other words, the imaging device 1 is not limited to a video camera, and may be an electronic device (for example, a mobile terminal device such as a smartphone) including an imaging unit and a display unit.

Internal configuration of imaging device 1

Figure 2:
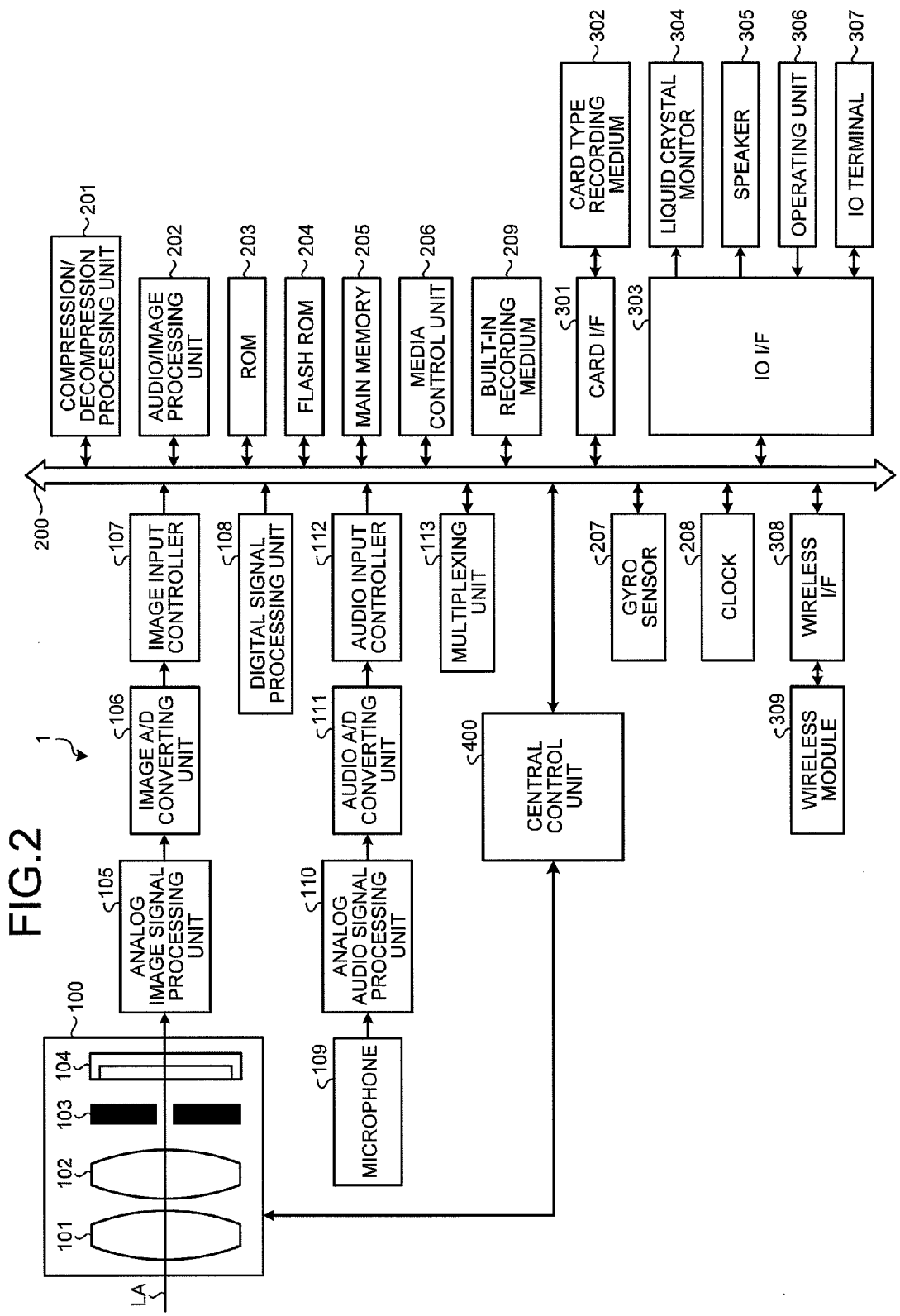
FIG. 2 is a block diagram illustrating a configuration of the imaging device according to the first embodiment.

Next, a configuration of the imaging device 1 will be described with reference to FIG. 2. FIG. 2 is a block diagram illustrating an internal configuration of the imaging device 1 according to the first embodiment.

A central control unit 400 is configured with: a semiconductor integrated circuit (IC) including a central processing unit (CPU); read only memory (ROM) storing various kinds of programs; random access memory (RAM) serving as a work area; and the like, and totally controls overall processing of the imaging device 1 such as imaging, a display of various kinds of images, and specifying an image (hereinafter, referred to as an "interface image") related to a graphic user interface (GUI) in which icon images corresponding to types of markers be used are appropriately arranged according to an imaging state so that the user can input a marker to imaged image data. An internal configuration of the central control unit 400 will be described later with reference to FIG. 8.

The imaging device 1 includes an imaging unit 100 which is configured with a zoom lens 101, a focus lens 102, a diaphragm 103, and an imaging element 104. The zoom lens 101 moves along a light axis LA by a zoom actuator (not illustrated). Similarly, the focus lens 102 moves along the light axis LA by a focus actuator (not illustrated). The diaphragm 103 is driven and operates by a diaphragm actuator (not illustrated). The imaging element 104 is configured with a charge coupled device (CCD), a complementary metal oxide semiconductor (CMOS), or the like.

An imaging operation performed by the imaging unit 100 is performed by the following process. The imaging element 104 performs photoelectric conversion on light that has passed through the zoom lens 101, the focus lens 102, and the diaphragm 103, and generates an analog image signal of a subject. An analog image signal processing unit 105 amplifies the analog image signal, and an image A/D converting unit 106 converts the amplified signal into digital image data. An image input controller 107 takes in the digital image data output from the image A/D converting unit 106 as imaged data, and stores the image data in a main memory 205 via a bus 200.

A digital signal processing unit 108 takes in the imaged data stored in the main memory 205 based on a command given from the central control unit 400 via the bus 200, and performs predetermined signal processing to generate data including a brightness signal and a color difference signal. The digital signal processing unit 108 further performs various kinds of digital corrections such as an offset process, a white balance adjustment process, a gamma correction process, an RGB compensation process, a noise reduction process, a contour correction process, a color difference correction process, and a light source type determination process.

A microphone 109 collects an ambient sound at the time of imaging, and generates an analog audio signal. An analog audio signal processing unit 110 amplifies the analog audio signal, and then an audio A/D converting unit 111 converts the amplified signal into digital audio data. An audio input controller 112 stores the digital audio data output from the audio A/D converting unit 111 in the main memory 205 together with the imaged data.

A multiplexing unit 113 performs multiplexing on compression data of the imaged data and digital audio data stored in the main memory 205, and generates stream data. Further, the multiplexing unit 113 performs a demultiplexing process on stream data stored in a card type recording medium 302, and generates video compression data and audio compression data separately.

A compression/decompression processing unit 201 performs a predetermined compression process on the imaged data and digital audio data stored in the main memory 205 according to a command given from the central control unit 400 via the bus 200, and generates compression data. Further, the compression/decompression processing unit 201 performs a decompression process of a predetermined form on video compression data and audio compression data stored in the card type recording medium 302 or the like according a command given from the central control unit 400, and generates decompression data. Further, in the imaging device 1 according to the first embodiment, a compression method conforming to the JPEG standard is employed for still images, and a compression method conforming to the MPEG2 standard or the AVC/H.264 standard is employed for moving images.

An audio/image processing unit 202 performs predetermined image processing on digital data read from the main memory 205 according to a command given from the central control unit 400 via the bus 200. For example, the audio/image processing unit 202 generates image data for various kinds of processing such as a menu image or an OSD image, and outputs the image data to a liquid crystal monitor 304 such that the image data is superimposed on original imaged data read from the main memory 205. According to this output, an image to be displayed on the liquid crystal monitor 304 is one in which various kinds of image data are combined or superimposed. Further, any other monitor such as an organic electro-luminescence (EL) monitor may be used instead of the liquid crystal monitor 304.

A ROM 203 is connected to the central control unit 400 via the bus 200, and stores a control program executed by the central control unit 400, and various kinds of data necessary for control, and the like. A flash ROM 204 stores various kinds of setting information related to an operation of the imaging device 1 such as user's setting information.

The main memory 205 is used as a temporary storage area of imaged data (a moving image and a still image). The main memory 205 stores stored multiplexed stream data (moving image file) in the card type recording medium 302 or a built-in recording medium 209 according to a command of the central control unit 400. At this time, the user may be given an option capable of selecting the card type recording medium 302 or the built-in recording medium 209 as a storage location of stream data. The main memory 205 is also used as an operation work area of the central control unit 400.

A media control unit 206 controls an operation of writing and reading data in or from the card type recording medium 302 or the built-in recording medium 209 through a card I/F 301 according to a command of the central control unit 400. The card type recording medium 302 is an external memory such as a (storage unit) SD card or a compact flash (a registered trademark), and is removably mounted to the imaging device 1. Further, the card type recording medium 302 stores at least one marker data file, a game data file, a marker type table, and a team table which will be described later.

A gyro sensor 207 detects a change in acceleration and angular velocities of three axes. Then, a display direction of the liquid crystal monitor 304 is changed according to a detection result of the gyro sensor 207. A clock 208 generates information representing a date and a time at which imaged image data is acquired or input time information representing a date and a time at which a marker is input. The built-in recording medium 209 is a memory such as RAM already equipped in the imaging device 1.

The liquid crystal monitor 304, a speaker 305, an operating unit 306, and an input output (IO) terminal 307 are connected to an IO I/F 303. For example, the liquid crystal monitor 304 displays an image generated from various kinds of image data such as imaged data, interface image data, or various kinds of menu image data which are temporarily recorded in the main memory 205. Here, imaged data to be output to the liquid crystal monitor 304 includes not only data recorded in a recording medium (not illustrated) such as a card type recording medium when the user turns on a record button (not illustrated) of the operating unit 306 but also data related to a so-called through-the-lens image which is displayed on the liquid crystal monitor 304 so that the user can check content to be imaged. For example, the speaker 305 outputs a sound temporarily recorded in the main memory 205.

The operating unit 306 (marker input unit) includes an operation button, a touch panel disposed on the liquid crystal monitor 304, or the like, and receives an operation input to the imaging device 1 by the user. For example, the user operates the operating unit 306 at a timing at which a marker is desired to be added, and inputs a marker to a moving image. The IO terminal 307 is connected to a television monitor or a personal computer (PC) which is not illustrated.

A wireless module 309 performs transmission and reception of data with another device via the bus 200 and a wireless I/F 308. Wireless communication of various kinds of information, imaged image data, and the like is performed according to a method conforming to the IEEE802.11 standard. More specifically, the wireless module 309 performs a communication process conforming to a wireless LAN standard such as Wi-Fi.

Details of card type recording medium 302

Figures 3, 4:
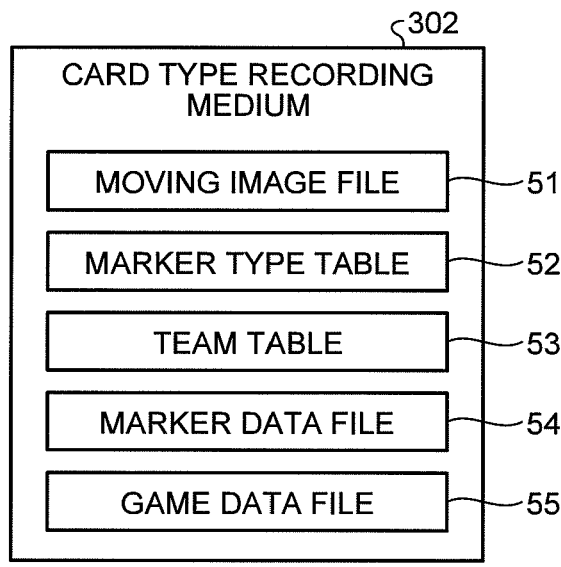
FIG. 3 is a block diagram illustrating a configuration of a card type recording medium according to the first embodiment.
FIG. 4 illustrates a marker type table according to the first embodiment.

Here, various kinds of data stored in the card type recording medium 302 will be described in detail with reference to FIG. 3. The card type recording medium 302 stores at least one moving image file 51, a marker type table 52, at least one marker data file 54, a game data file 55, and a team table 53 as illustrated in FIG. 3. The card type recording medium 302 can store data other than data illustrated in FIG. 3, but a description of data that does not relate directly to the present invention will be omitted.

The moving image file 51 is the above-described stream data, and is data of a moving image in which imaged data and audio data are multiplexed. The card type recording medium 302 stores a plurality of moving image files 51. A moving image including an event is recorded in the moving image file 51. A single event may be recorded throughout a plurality of moving image files 51, or a plurality of events may be recorded in a single moving image file 51.

Here, an event means one in which a start and an end are specified, and a participant is present. The participant(s) of an event may be an individual (person) or may be a team, a group, or a pair in which a plurality of persons are gathered. For example, an event refers to a sport game, a live-music, a play, or the like. Further, in a live-music, a play, or the like, a participant is a singer, a performer, or the like. In the first embodiment, a basketball game is described as an event.

The marker type table 52 is a table in which a marker ID (identification information) and a marker corresponding to the marker ID are stored in association with each other. Further, a marker means an indicator representing an arbitrary time of a moving image. For example, a marker is a text or an image which is different from a moving image being played back and displayed on the moving image. A marker is input according to the user's operation on the operating unit 306 or input automatically by the imaging device 1 according to a predetermined condition.

FIG. 4 illustrates an example of the marker type table 52. The marker type table 52 illustrated in FIG. 4 stores six types of marker IDs and markers. A marker corresponding to a marker ID 10 is a game start marker (start marker) that represents a start of a game. A marker corresponding to a marker ID 20 is a game end marker (end marker) that represents an end of a game. A marker corresponding to a marker ID 30 is a score marker (score marker) representing that a score is made. A marker corresponding to a marker ID 40 is a check marker representing a check time. A marker corresponding to a marker ID 50 is a smile marker representing that a smile is shown, and a marker corresponding to a marker ID 60 is a good marker representing a good play. Further, types of markers are not limited to the example illustrated in FIG. 4. Further, a marker may be an image rather than a text.

The team table 53 (participant table) is a table in which a team ID, a team name of a team corresponding to the team ID, and the like are stored in association with one another. In other words, data stored in the team table 53 may be input by the user in advance or may be read from another memory or a server by the imaging device 1.

FIG. 5 illustrates an example of the team table 53. The team table 53 illustrated in FIG. 5 stores three pieces of team data. The team data is the data in which a team name and a team ID are associated with each other. In addition, a team color and a player name of a team are also associated with a team ID. For example, a team ID 1 is associated with a team name "OOO stars," a team color "blue," and player names "Suzuki, Tanaka, and the like."Further, information included in the team data is not limited to the example illustrated in FIG. 5.

The marker data file 54 is a file including one or more pieces of marker data. Here, marker data includes at least a marker ID representing an input marker and an input time representing a time at which a marker is input. The marker data file 54 is stored in the card type recording medium 302 in association with the moving image file 51. For example, a plurality of marker data files 54 are associated with a plurality of moving image files 51 in a one-to-one manner.

FIG. 6 illustrates an example of the marker data file 54. The marker data file 54 illustrated in FIG. 6 stores six pieces of marker data. In the marker data file 54 illustrated in FIG. 6, an input time is represented by milliseconds (ms). For example, first marker data includes a marker ID "10" and an input time of "8521 ms". As illustrated in FIG. 4, the marker of the marker ID 10 is the game start marker. In other words, the first marker data of the marker data file 54 means that the game start marker is input at a time of 8521 ms. At this time, a time means that an elapsed time (hereinafter, referred to as an "intra-media time") when a beginning time of a moving image file is set to "0".

Further, when the game start marker data of the marker ID 10 is input by the user, a team ID of a team to play a game is also input. The first marker data of the marker data file illustrated in FIG. 6 is game start marker data of a game in which the team of the team ID 1 plays a game against a team of a team ID 2.

Further, when the score marker of the marker ID 30 is input by the user, a team ID of a team which makes a score and a score are also input. Second marker data of the marker data file illustrated in FIG. 6 is marker data of the score marker representing that the team of the team ID 1 has scored 2 points. Similarly, third marker data of the marker data file illustrated in FIG. 6 is the score marker data representing that the team of the team ID 1 has scored 3 points.

At this time, a score stored in the marker data file is not a total score but a score added when a score is made. In this example, in the third marker data, "3" is stored in a score field rather than "5" (=2+3).

As a score to be added is stored in the marker data as described above, when it is desired to revise a previously input score of the marker data, only a score that is desired to be revised may be revised. Then, a revised total point can be easily calculated by adding up scores stored in the respective score marker data again.

Meanwhile, when a total score at that point in time is stored in the score field of the marker data, it is difficult to use the sum of the scores stored in the respective score marker data in order to calculate the revised total score even when a score of marker data which is desired to be revised has been revised. For this reason, all pieces of score marker data input after the revised marker data have to be revised. In other words, when the total score is stored in the score field of the marker data, it takes a time and efforts to revise a score.

The game data file (event data file) 55 is a file including one or more pieces of game data. The game data is associated with a moving image file in which a corresponding game is recorded.

Figures 7, 8:
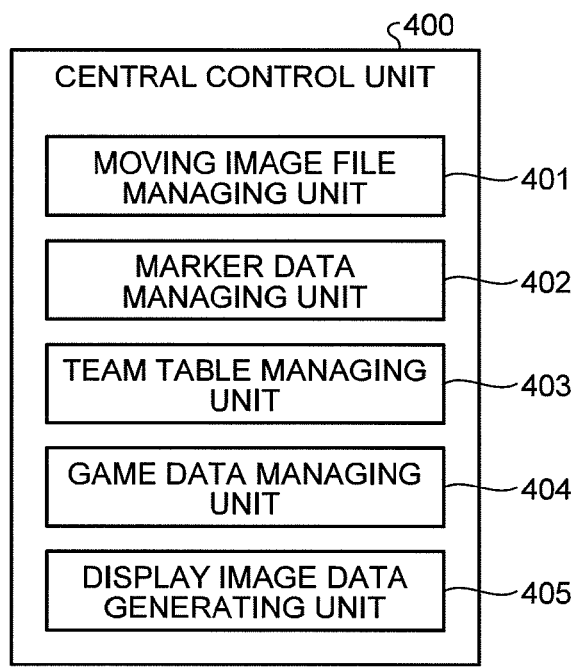
FIG. 7 illustrates a game data file according to the first embodiment.
FIG. 8 is a block diagram illustrating a configuration of a central control unit according to the first embodiment.

FIG. 7 illustrates an example of the game data file 55. The game data file 55 illustrated in FIG. 7 includes three pieces of game data. In the example illustrated in FIG. 7, game data includes a game name, a game date and time, a team ID representing a team that takes part in a game, and a file name of a moving image file. The file name of the moving image file is information for identifying a moving image file, and for example, includes a five-digit ID and an extension. As a file name of a moving image file is stored, the imaging device 1 can easily access a corresponding moving image file.

For example, first game data of the game data file illustrated in FIG. 7 is the game data representing that a game name "newcomer game," a game date and time is "10:00 to 13:30, Apr. 15, 2012," team IDs of team to play are "1 and 2," and a file name is "00000.MTS."

At this time, information related to a game such as a team name, a game date and time, and a score can be acquired with reference to the team table and the marker data file. However, the marker data file is stored for each moving image file. Further, information related to a plurality of games may be included in a single marker data file, or information related to a single game may be stored in a plurality of marker data files. Thus, it takes a time and efforts for the user to manually search for information related to a game.

On the other hand, the imaging device 1 according to the first embodiment can generate a table (the game data file 55) in which information related to a game is stored for each game by generating a game data. In other words, the imaging device 1 can generate an index of a game stored in the card type recording medium 302. For example, the imaging device 1 causes an index in which game names and game dates and times are listed to be displayed on the liquid crystal monitor 304 (the table illustrated in FIG. 7 may be displayed as it is). Through this index, the user can easily select a game which he/she wants to watch. Further, data included in the game data is not limited to the example illustrated in FIG. 7. For example, when a game scene is included in a part of a moving image file, that is, when a game starts or ends in the middle of a moving image file, a period of time from the head of the moving image file to the game starts or ends may be included in the game data. In this case, when the user selects a game desired to watch through the game index, the imaging device 1 can easily recognize a start position or an end position of a game included in a corresponding moving image file.

Details of Central Control Unit 400

Next, an internal configuration of a central control unit 400 will be described with reference to FIG. 8. The central control unit 400 includes a moving image file managing unit 401, a marker data managing unit 402, a team table managing unit 403, a game data managing unit 404, and a display image data generating unit 405.

The moving image file managing unit 401 performs, for example, a process of recording, playing back, copying, or deleting a moving image file based on the user's operation.

When a moving image file is copies or deleted, the marker data managing unit 402 copies or deletes the marker data file associated with the moving image file.

For examples, the team table managing unit 403 generates, edits, copies, or deletes the team table. Specifically, the team table managing unit 403 generates or edits the team data based on an input from the user. Further, the team table managing unit 403 updates the team table based on the team data transmitted from another device.

For example, the game data managing unit 404 generates, edits, copies, or deletes the game data file. The game data managing unit 404 generates the game data based on content of the game start marker data, the score marker data, and the like.

The display image data generating unit 405 generates display image data used to display a moving image together with an interface image and a marker. In other words, the display image data generating unit 405 causes the interface image data or the marker image data to be superimposed on the moving image file. The display image data generating unit 405 outputs the generated display image data to the liquid crystal monitor 304.

For example, the interface image data used to display the interface image may be stored in the card type recording medium 302 in advance or may be acquired from a server (not illustrated) or an arbitrary storage device (for example, a so-called USB memory) removably mounted to the imaging device 1.

Figure 9:
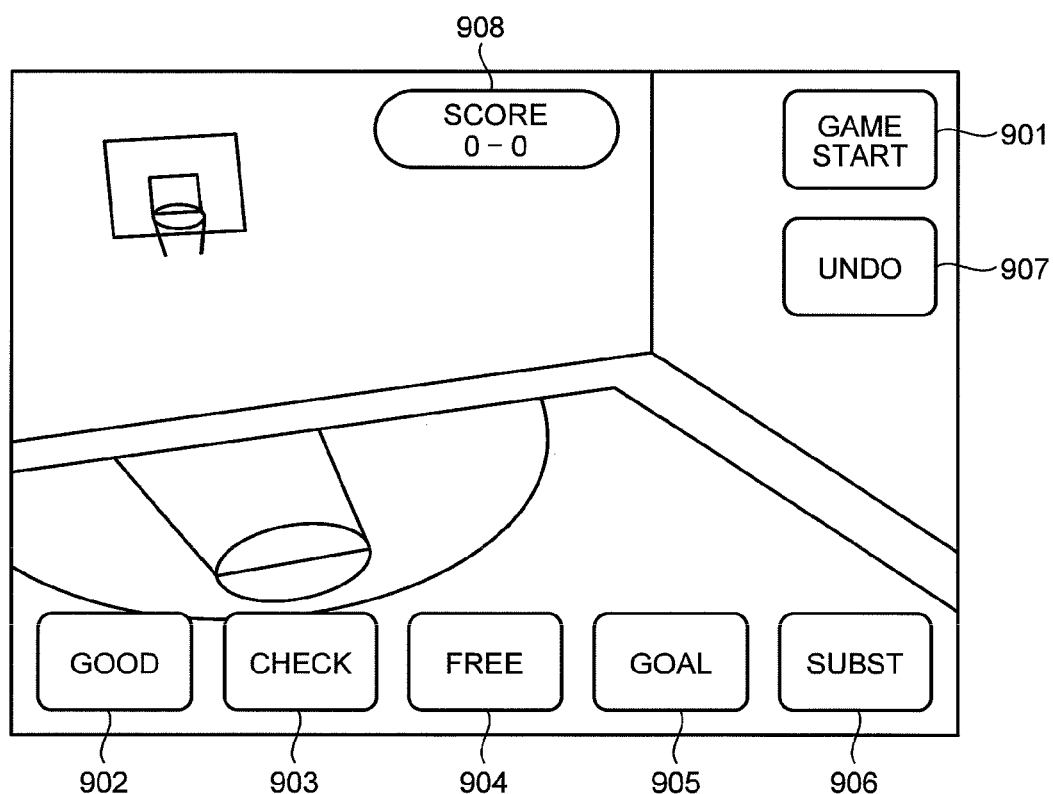
FIG. 9 is a diagram for describing an interface image according to the first embodiment.

The display image data generated by the display image data generating unit 405 is output to the liquid crystal monitor 304 through the IO I/F 303. The liquid crystal monitor 304 displays a display image related to the supplied display image data. FIG. 9 is a diagram illustrating an example of a display image displayed on the liquid crystal monitor 304. The liquid crystal monitor 304 displays the display image in which a moving image being currently captured is combined with a relevant interface image as illustrated in FIG. 9. The user appropriately inputs a marker while watching a moving image or an actual game using interface image used to input a marker (marker icon).

The display image illustrated in FIG. 9 is displayed such that an interface image used to input a marker is superimposed on an imaged image of a basketball game. The interface image includes a game start marker icon 901 (GAME START), a good marker icon 902 (GOOD), a check marker icon 903 (CHECK), a free marker icon 904 (FREE), a score marker icon 905 (GOAL), and a player substitution marker icon 906 (SUBST) as marker icons as illustrated in FIG. 9, and is configured to input the markers. Further, a free marker means a marker freely settable by the user. The interface image further includes a marker undo icon 907 (UNDO), and a marker which is input last can be undone. Further, on the upper portion of the display screen, a score window 908 representing a score updated according to an operation of the score marker icon 905 is displayed on a moving image as one interface image.

For example, when the user touches the game start marker icon 901, the time information (input time information) and the marker ID of the game start marker are stored in the card type recording medium 302 as the marker data in association with each other. At this time, the user also selects teams that play a game through a team selection screen (not illustrated). Further, the team data stored in the team table is input by the user in advance. Through this operation, the game start marker data is associated with a marker ID, time information, and a team (the team ID) to play (see FIG. 6). This operation is similarly applied to the good marker icon 902, the check marker icon 903, the free marker icon 904, and the player substitution marker icon 906.

Figure 10:
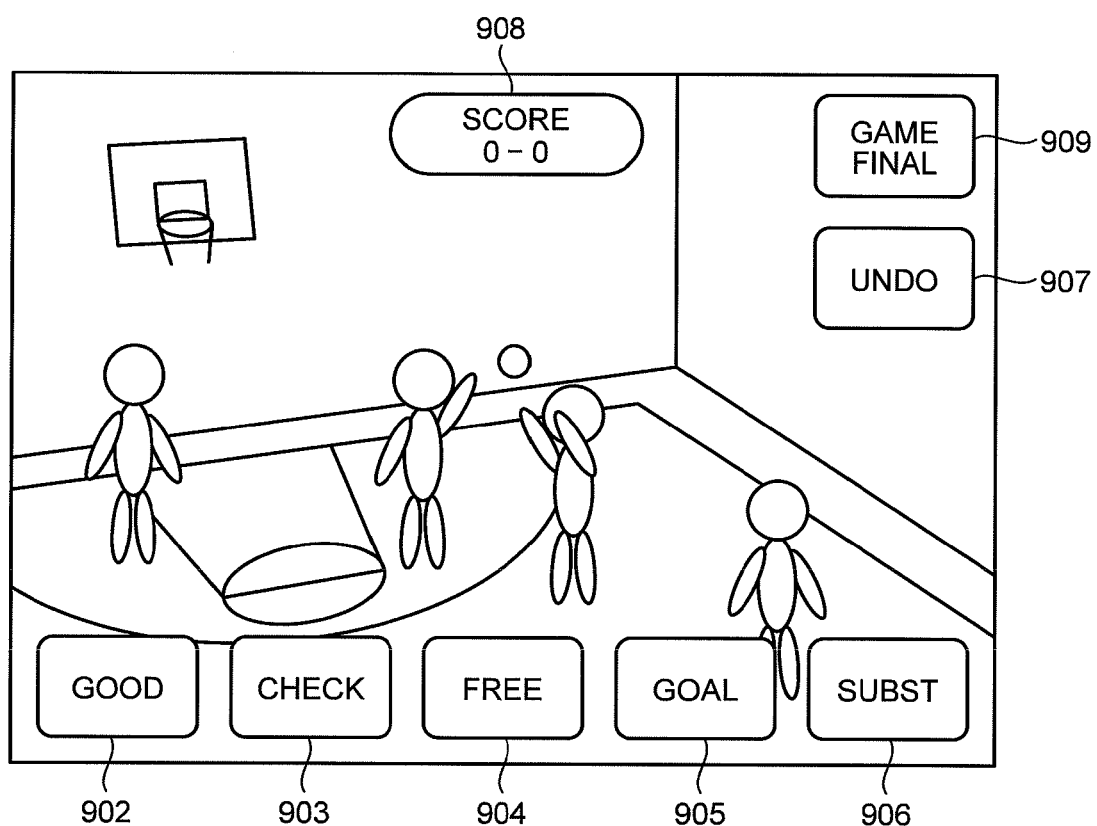
FIG. 10 is a diagram for describing an interface image according to the first embodiment.

When the game start marker icon 901 is touched, the game start marker icon 901 changes to a game end marker icon 909 (GAME FINAL) (see FIG. 10). The user touches the game end marker icon and inputs the game end marker to the moving image when the game ends. Through this operation, the game end marker data in which the game end marker is associated with the input time is stored in the marker data file.

Figure 11:
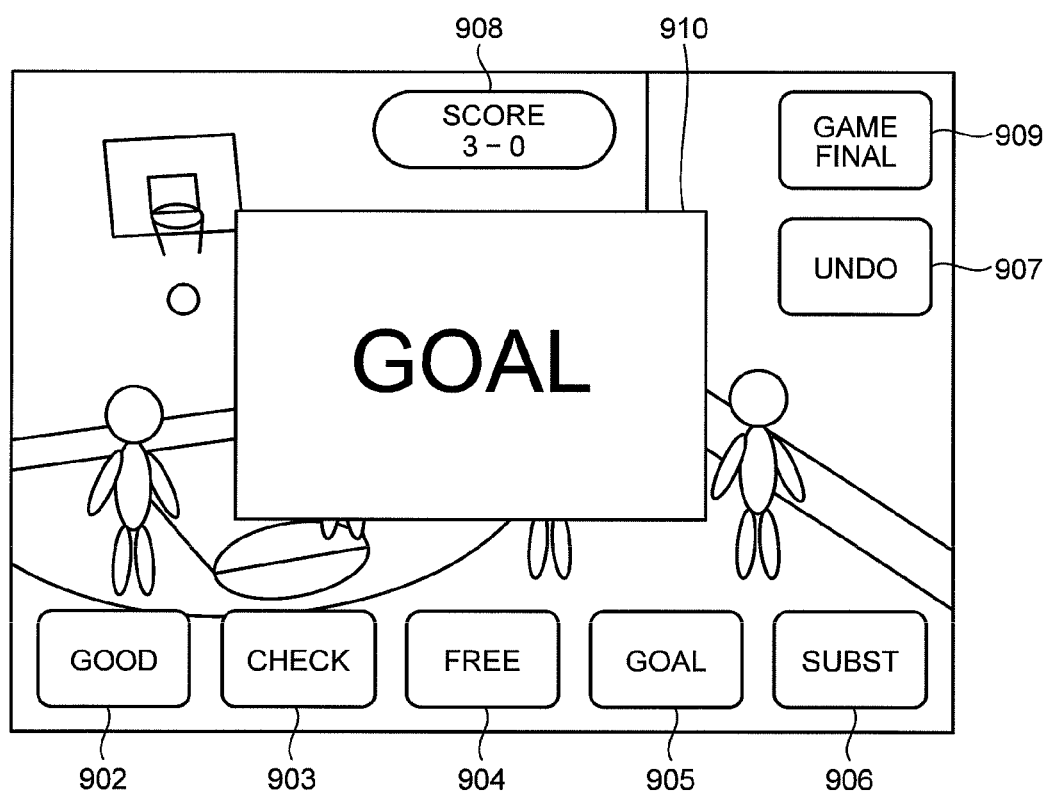
FIG. 11 is a diagram for describing an interface image according to the first embodiment.

Similarly, when a point is scored, the user touches the score marker icon 905. At this time, the input time and the score marker are stored in the marker data file as the score marker data in association with each other. Then, a score marker 910 is displayed on the moving image being displayed on the liquid crystal monitor 304 as illustrated in FIG. 11.

Figure 12:
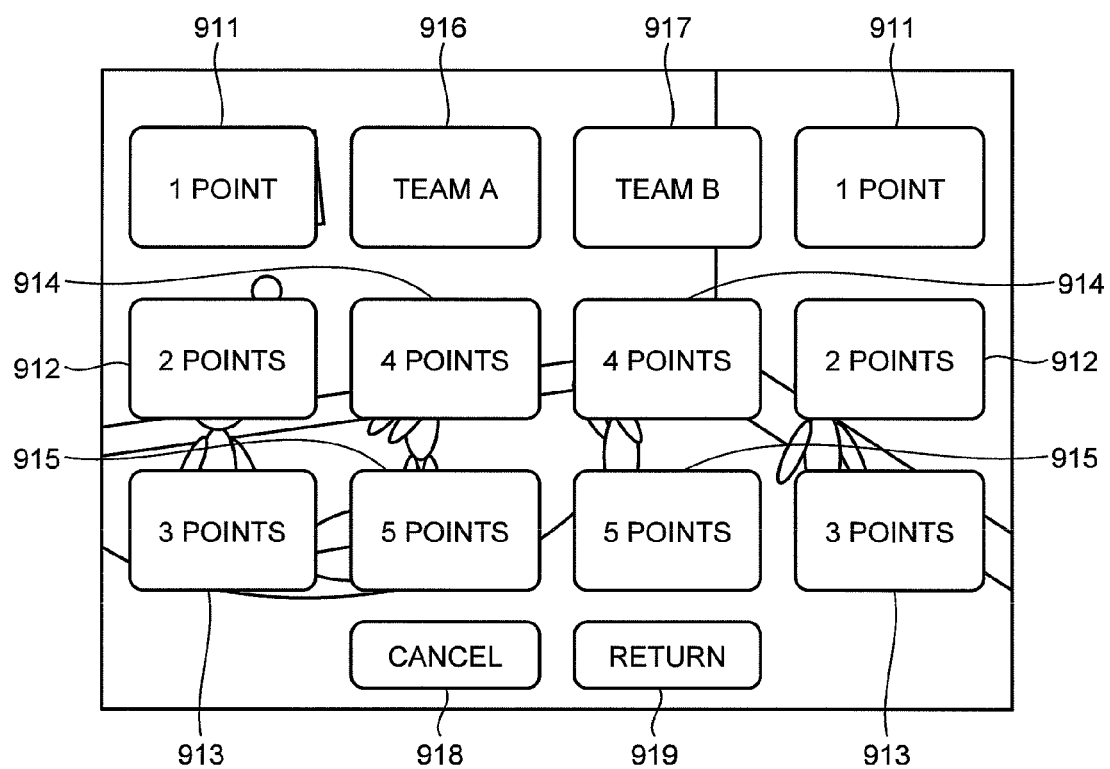
FIG. 12 is a diagram for describing an interface image according to the first embodiment.

Thereafter, an interface image through which a team having made a score and an obtained score can be selected is displayed as illustrated in FIG. 12. The interface image illustrated in FIG. 12 includes one-score to five-score marker icons 911 to 915, team icons 916 and 917, a cancellation icon 918 used to cancel an operation, and a return icon 919 used to return to an immediately previous screen. When a "Team A" displayed on the team icon 916 makes a score, the user touches any one of the one-score to five-score marker icons 911 to 915 displayed on the left half of the screen. Meanwhile, when a "Team B" displayed on the team icon 917 makes a score, the user touches any one of the one-score to five-score marker icons 911 to 915 displayed on the right half of the screen. Through this operation, a team ID of a team that has made a score and an obtained score are associated with a score marker ID, and stored in the marker data file as the marker data. Further, an arrangement and the size of the interface images (marker icons) are not limited to the examples illustrated in FIGS. 9 to 12. Further, the number or the types of marker icons may be appropriately customized by the user.

Further, a plurality of interface images may be prepared so that markers of different types or contents are input for the same sport. For example, a game interface image and a practicing interface image may have different configurations. Further, the present invention is not limited to a sport, and of course, an interface image used to image a play, a music concert, or the like may be provided.

Operation of Imaging Device 1

Next, various operations of the imaging device 1 according to the first embodiment will be described with reference to flowcharts of FIGS. 13 to 18.

Media Mount

Figure 13:
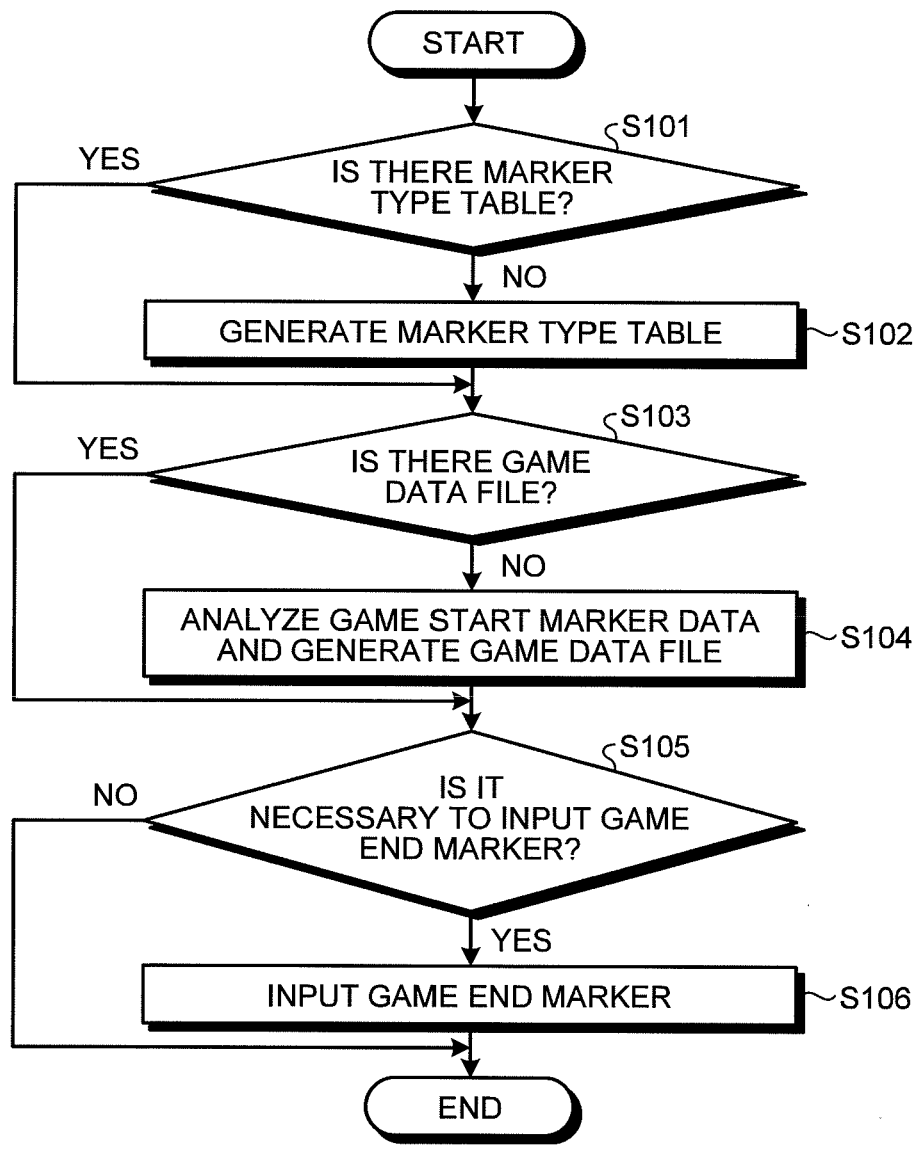
FIG. 13 is a flowchart illustrating a media mount operation according to the first embodiment.
Figure 14:
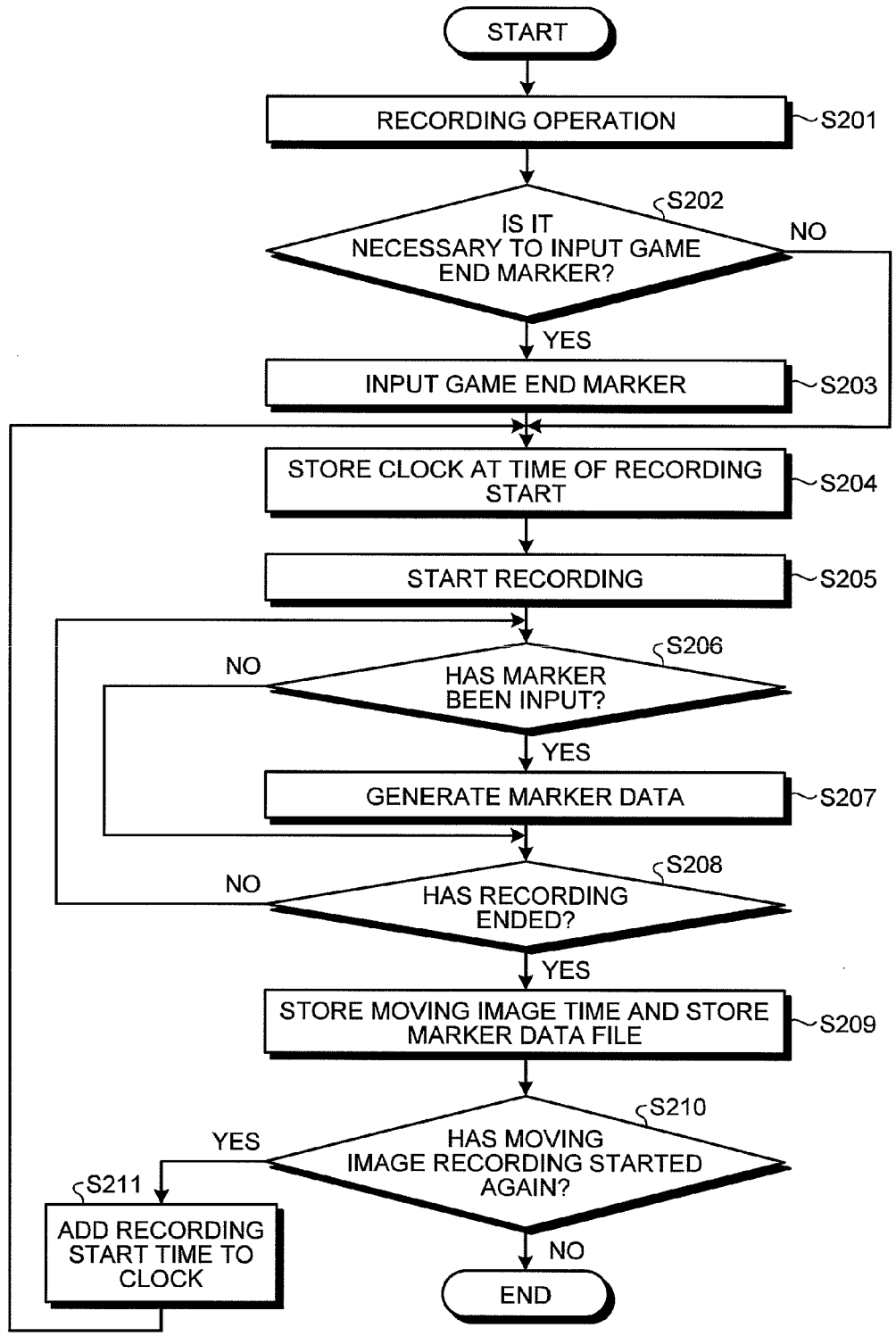
FIG. 14 is a flowchart illustrating a recording operation according to the first embodiment.

First of all, a media mount process operation will be described. FIG. 13 is a flowchart illustrating a media mount process. First, the marker data managing unit 402 determines whether a default marker type table is stored in the card type recording medium 302 (step S101).

When it is determined that no marker type table is stored in the card type recording medium 302 (No in step S101), the marker data managing unit 402 generates a default marker type table (step S102). Specifically, information related to the default marker type table is written in advance in a program referred when the marker data managing unit 402 performs processing. Then, when generating the default marker type table, the marker data managing unit 402 reads the program, and generates the default marker type table in the card type recording medium 302. However, when it is determined that the marker type table is stored in the card type recording medium 302 (Yes in step S101), the marker type table is not generated, and the process proceeds to the next step.

Next, the game data managing unit 404 determines whether a game data file is stored in the card type recording medium 302 (step S103). When it is determined that no game data file is stored in the card type recording medium 302 (No in step S103), the game data managing unit 404 analyzes all marker data of the marker data file stored in the card type recording medium 302. Then, the game data managing unit 404 generates a game data file based on marker data (step S104).

Specifically, the game data managing unit 404 generates a game date and time in game data with reference to a generation date and time of a moving image file. Further, the game data managing unit 404 specifies a team (the team ID) to play with reference to the game start marker data in the marker data file. Then, the game data managing unit 404 generates a team ID in game data. However, when it is determined that a game data file is stored in the card type recording medium 302 (Yes in step S103), a game data file is not generated, and the process proceeds to the next step.

Next, the marker data managing unit 402 analyzes the marker data file, and determines whether it is necessary to input the game end marker (step S105). Specifically, the marker data managing unit 402 determines that it is necessary to input the game end marker when both of the following two conditions (a) and (b) are satisfied: (a) when the game end marker is not input after the game start marker is input last; and (b) when the clock of the imaging device 1 is not set yet, a generation date and time of a moving image file in which the game start marker is input last is unclear, or when an elapsed time after the last game start marker is input exceeds 12 hours.

When it is determined that it is necessary to input the game end marker (Yes in step S105), the marker data managing unit 402 inputs the game end marker to the end position (the tail of a marker data file) of a moving image file recorded last, that is, a moving image file whose generation date and time is latest (step S106). However, when it is determined that it is unnecessary to input the game end marker (No in step S105), the media mount process ends.

Moving Image Recording

Next, a moving image recording process operation will be described. FIG. 13 is a flowchart illustrating a moving image recording process. First of all, as the user performs a recording operation using the operating unit 306, the imaging device 1 starts a recording operation (step S201). The marker data managing unit 402 analyzes the marker data file, and determines whether it is necessary to input the game end marker (step S202).

At this time, the marker data managing unit 402 determines that it is necessary to input the game end marker when both of the conditions (a) and (b) described in step S105 of FIG. 13 are satisfied. Then, when it is determined that it is necessary to input the game end marker (Yes in step S202), the marker data managing unit 402 inputs the game end marker to the end position of the moving image file before recording starts (step S203). In other words, the marker data managing unit 402 inputs (adds) the game end marker to the tail of the marker data file corresponding to the moving image file. Further, when it is determined that it is unnecessary to input the game end marker (No in step S202), the game end marker is not input, and the process proceeds to the next step.

Next, the imaging device 1 stores a clock at the time of recording start (step S204). For example, the moving image file managing unit 401 stores the clock at the time of recording start in memory such as the card type recording medium 302. A clock refers to an operation clock of a CPU of the central control unit 400. Then, the moving image file managing unit 401 starts storing the imaged data in the card type recording medium 302. In other words, the moving image file managing unit 401 starts recording (step S205).

Then, the marker data managing unit 402 determines whether the user has input a marker (step S206). When it is determined that a marker has been input, the marker data managing unit 402 generates marker data according to the input marker (step S207). Specifically, the marker data managing unit 402 calculates an intra-media time (a time from when a moving image starts to be recorded) based on a difference between a clock in which the marker is input and the clock at the time of recording start stored in step S204. Then, the marker data managing unit 402 generates marker data such that the intra-media time is associated with a marker ID of the input marker (step S207).

Next, the moving image file managing unit 401 determines whether the user has performed a recording end operation using the operating unit 306 (step S208). When it is determined that the recording end operation has been performed (Yes in step S208), the moving image file managing unit 401 stops the process of storing the imaged data in the card type recording medium 302, and ends the recording. Further, the moving image file managing unit 401 stores the intra-media time at the time of recording end in the card type recording medium 302 or the like. Further, the marker data managing unit 402 stores the generated marker data in the marker data file (step S209).

Next, the moving image file managing unit 401 determines whether a new moving image recording has started (step S210). Specifically, the moving image file managing unit 401 determines whether the new moving image recording has started based on division of a moving image file by a 4 GB limitation. When it is determined that the new moving image recording has not started (No in step S210), the moving image recording operation ends. Here, the division of a moving image file by 4 GB means that since the upper limit of capacity that can be stored as a single moving image file is 4 GB, imaged data is divided into a plurality of moving image files.

Meanwhile, when it is determined that the new moving image recording has started (Yes in step S210), the moving image file managing unit 401 converts an intra-media time at the time of recording end into a clock (an operation clock of a CPU). Then, the moving image file managing unit 401 adds the converted clock to the clock at the time of recording start stored in the card type recording medium 302 in step S204 (step S211). Thus, even when recording of a new moving image file has started from division of a moving image file by a 4 GB limitation, it is possible to accurately detect a clock at the time of recording start of the corresponding moving image file. The subsequent process (steps S204 to S210) is the same as the above-described operation, and thus a description thereof will be omitted.

Further, when an undo process (a process of deleting an immediately previously input marker) is performed before a new marker is input after new moving image recording starts, the marker data managing unit 402 reads out a marker data file including marker data to be deleted from the card type recording medium 302. Then, the marker data managing unit 402 deletes the last marker data of the read marker data file, and stores the marker data file in the card type recording medium 302 again.

Moving Image Playback

Figure 15:
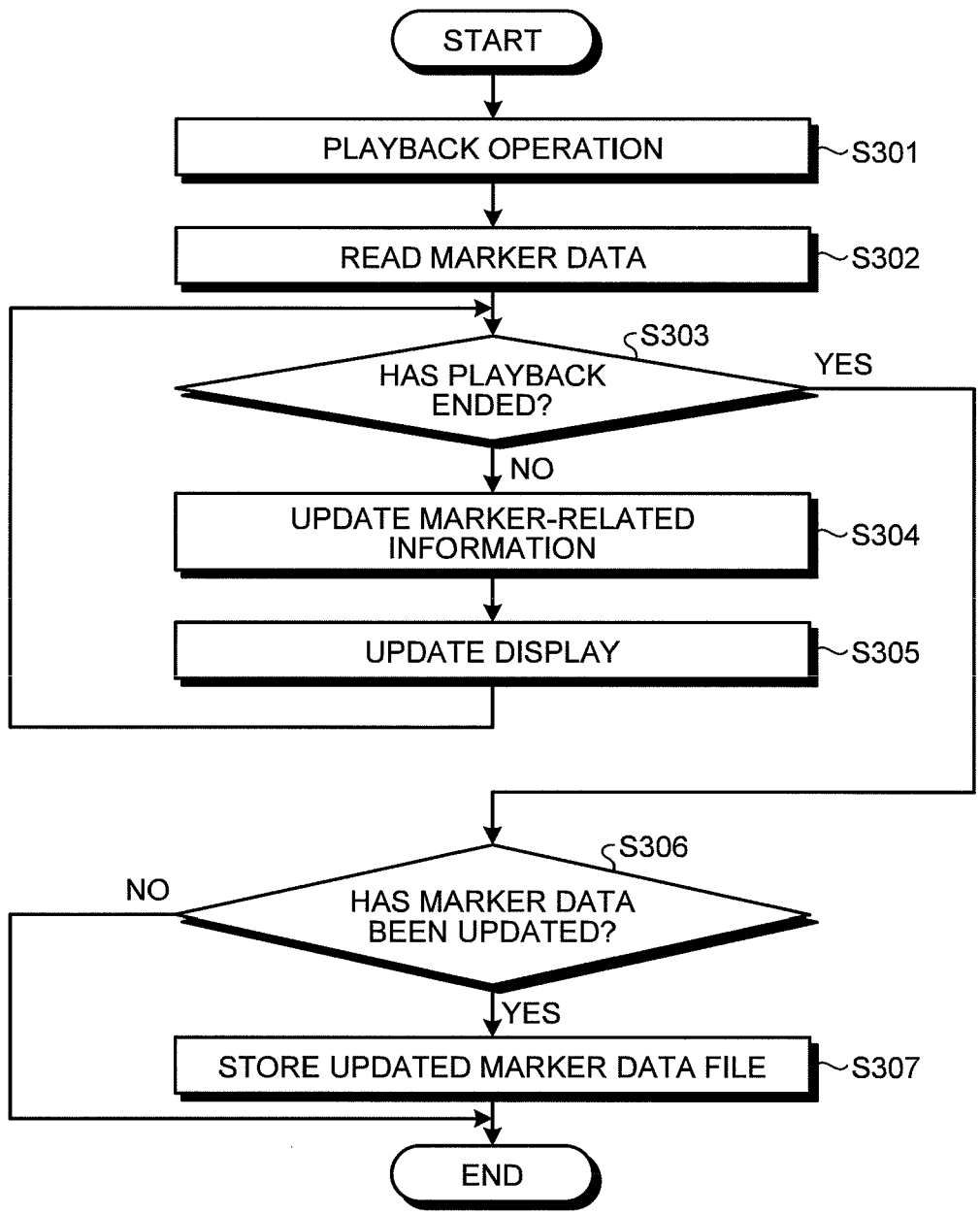
FIG. 15 is a flowchart illustrating a playback operation according to the first embodiment.

Next, a moving image playback process operation will be described. FIG. 15 is a flowchart illustrating a moving image playback process. First of all, when the user performs a playback operation using the operating unit 306, the imaging device 1 starts a moving image playback operation (step S301).

Next, the marker data managing unit 402 reads in a marker data file associated with a moving image file that starts to be played back from the card type recording medium 302 (step S302).

Next, the moving image file managing unit 401 determines whether the playback of the moving image file has ended (step S303). When it is determined that the playback has not ended (step S303), the marker data managing unit 402 updates marker-related information (step S304). Specifically, the marker data managing unit 402 acquires a time of a moving image file, and updates the marker-related information to be updated at the acquired time.

At this time, the marker-related information refers to information related to, for example, "a marker type to be displayed by an icon", "whether a marker is inputtable", "whether a marker is deletable", "whether a game is in progress", "an opponent team name in a game", and "a current score in a game." The marker data managing unit 402 updates the marker-related information, and updates a display of the moving image when there is a marker to be displayed, changed, or deleted in the moving image being played back (step S305).

For example, when there is a marker to be displayed at a time of a moving image file as the marker-related information is updated, the display image data generating unit 405 generates display image data in which image data of the marker to be displayed is superimposed on the moving image data being played back. Then, the moving image file managing unit 401 causes the marker to be displayed on the moving image being played back, for example, as illustrated in FIG. 11. Further, when a score is changed as the marker-related information is updated, the display image data generating unit 405 generates display image data on which a changed score is displayed (for example, display image data in which a display of a score window has been changed as illustrated in FIG. 11).

Thereafter, the moving image file managing unit 401 determines again whether the playback has ended (step S303). When it is determined that the playback has not ended yet (No in step S303), the marker data managing unit 402 updates the marker-related information again (step S304). In other words, the update of the marker-related information (step S304) and the display update (step S305) are performed at regular intervals (for example, at intervals of 500 ms) until the playback ends.

Meanwhile, when it is determined that the playback has ended (Yes in step S303), the marker data managing unit 402 determines whether a marker data file corresponding to the moving image file has been updated (added, deleted, or changed) during the playback of the moving image file (step S306). When it is determined that the marker data file has not been updated (No in step S306), the moving image playback operation ends.

However, when it is determined that the marker data file has been updated (Yes in step S306), the marker data managing unit 402 stores the updated marker data file in the card type recording medium 302 in association with the played moving image file (step S307).

Further, the playback start of a moving image file described above includes a case in which a next moving image file is played back according to switching of a file in divided moving image files as well. Further, the playback end of a moving image file includes the end of a playback of a previous moving image file according to switching of a file in divided moving image files as well.

Further, the moving image file managing unit 401 can further perform a digest playback. The digest playback means that only a moving image, around an input time of each marker data included in a marker data file associated with a corresponding moving image file among moving image files which are subjected to the digest playback, is played back. The moving image around an input time is, for example, a moving image having the duration of 3 seconds before and after the input time of a marker. Through this operation, the user can watch a digest of a game. Further, a marker serving as a target of the digest playback may be appropriately set by the user. For example, when the user desires to watch a digest of only a score scene, the user sets a marker serving as a target of the digest playback as the score marker. Through this operation, the moving image file managing unit 401 plays back only the moving image around the input time of the score marker.

Moving Image Copy

Figure 16:
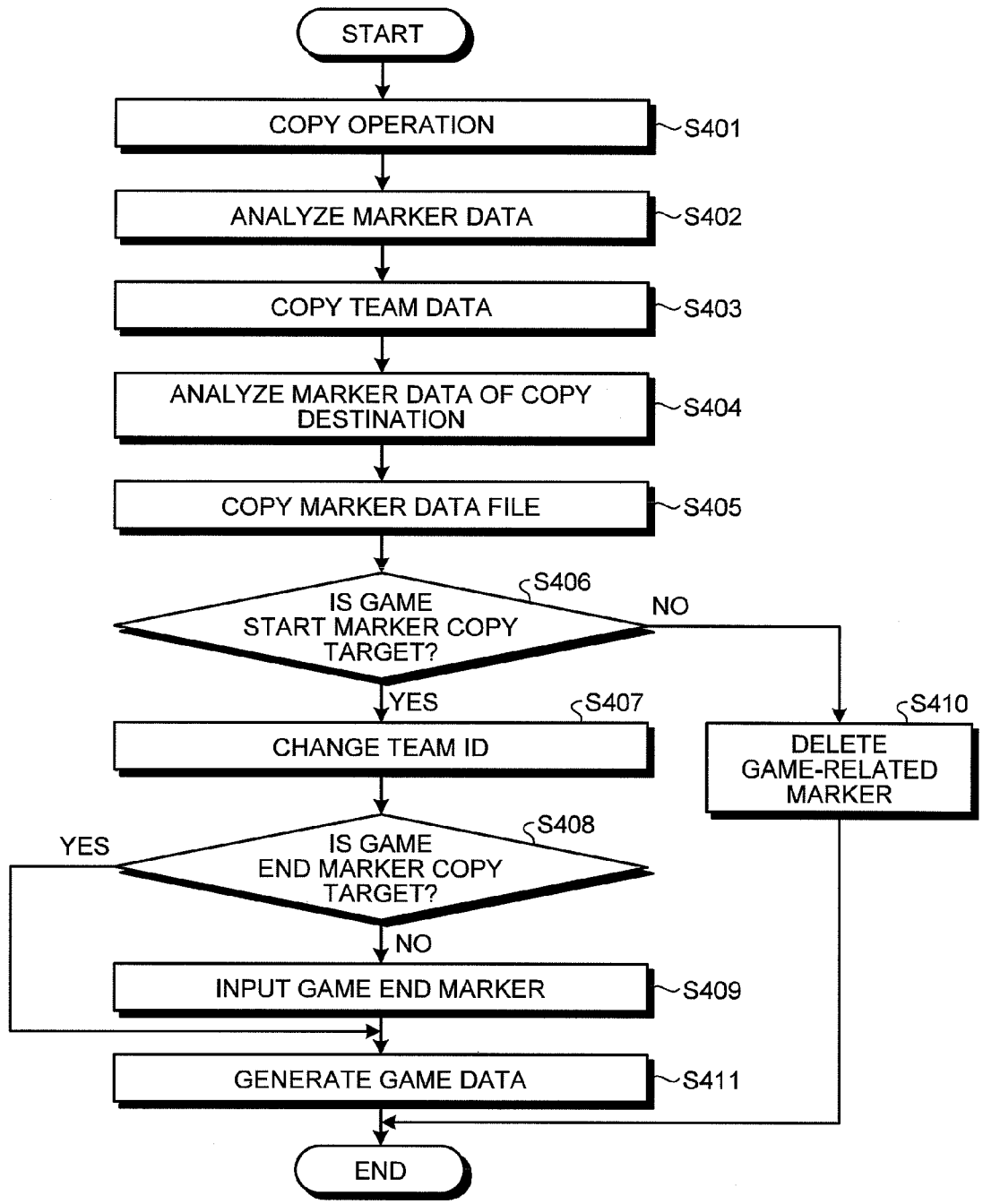
FIG. 16 is a flowchart illustrating a copy operation according to the first embodiment.

Next, a moving image copy process operation will be described. A moving image copy means that a moving image file stored in the built-in recording medium 209 of the imaging device 1 is copied to the card type recording medium 302. Further, when there is a plurality of recording media serving as a recording location (a copy destination) of a copied moving image file, the user may be given an option capable of selecting a recording location. FIG. 16 is a flowchart illustrating a moving image copy process. First of all, the user selects a moving image file to be copied using the operating unit 306, and performs a copy operation. Through this operation, the moving image file managing unit 401 reads the selected moving image file, and transmits the copied moving image file to the copy destination (step S401).

Next, the marker data managing unit 402 analyzes a marker data file (hereinafter, referred to as a "copy target marker data file") associated with the copied moving image (step S402). Specifically, the marker data managing unit 402 searches whether the game start marker and the game end marker are included in the copy target marker data file and marker data files prior and subsequent thereto.

Next, the team table managing unit 403 copies team data included in a team table to a team table of the copy destination for an opponent team of the game start marker included in the copy target marker data file (step S403). At this time, the team table managing unit 403 allocates a new ID to the copied team data in the team table of the copy destination.

The marker data managing unit 402 analyzes existing marker data of the copy destination (step S404). Then, when there is the game start marker but there is no game end marker (when a game is in progress), the marker data managing unit 402 inputs the game end marker to the end of the last marker data file.

The marker data managing unit 402 copies the copy target marker data file (step S405). In other words, the marker data managing unit 402 generates the copy target marker data file in the copy destination.

Next, the marker data managing unit 402 determines whether the game start marker data is included in the copied marker data file (the marker data file copied to another memory in the imaging device 1) (step S406). When the game start marker data is a copy target (Yes in step S406), the team table managing unit 403 changes the team ID included in the game start marker data to the team ID newly allocated in the copy destination in step S403 (step S407).

Thereafter, the marker data managing unit 402 determines whether the game end marker data corresponding to the game start marker data detected in step S406 is the copy target (step S408).

When it is determined that the game end marker data is not the copy target (No in step S408), the marker data managing unit 402 inputs the game end marker to the end position (the last portion of the copy target marker data file) of the moving image file of the copy target (step S409). Further, when it is determined that the game end marker data is the copy target (Yes in step S408), the process of inputting the game end marker is not performed, and the process proceeds to the next step.

Lastly, the game data managing unit 404 generates game data based on information (a team, a score, and the like) of a game included in the copied marker data file, and adds the game data to the game data file of the copy destination (step S411).

However, when it is determined that the game start marker data is not the copy target (No in step S406), the marker data managing unit 402 deletes game-related marker data (the game end marker and the score marker) from the copied marker data file (step S410).

Further, when a single game is recorded throughout a plurality of moving image files, and the moving image files are individually copied, the marker data file corresponding to each moving image file is also considered to be copied as it is. In this case, a game-related marker included in each marker data file is also copied. For this reason, a plurality of pieces of game data are generated in connection with the same game based on the game-related marker included in each marker data file. Thus, a plurality of pieces of game data of the same game performed in the same teams is stored in the game data file, and an index of a game is complicated and difficult to understand.

On the other hand, according to the configuration of the imaging device 1, in step S410, the marker data managing unit 402 does not copy the game-related marker data when the game start marker data is not the copy target marker data as described above. Thus, it is difficult for the game data managing unit 404 to acquire information related to a game on the copied moving image file in the copy destination. In other words, it is difficult to generate game data corresponding to the copied moving image file. For this reason, even when a single game is recorded throughout a plurality of moving image files, and the moving image files are individually copied, the game data is copied only when the moving image file associated with the marker data file including the game start marker data is copied. Thus, single game data is generated for a single game. Accordingly, it is possible to prevent a plurality of pieces of game data from being generated for the same game.

Moving Image Deletion

Figure 17:
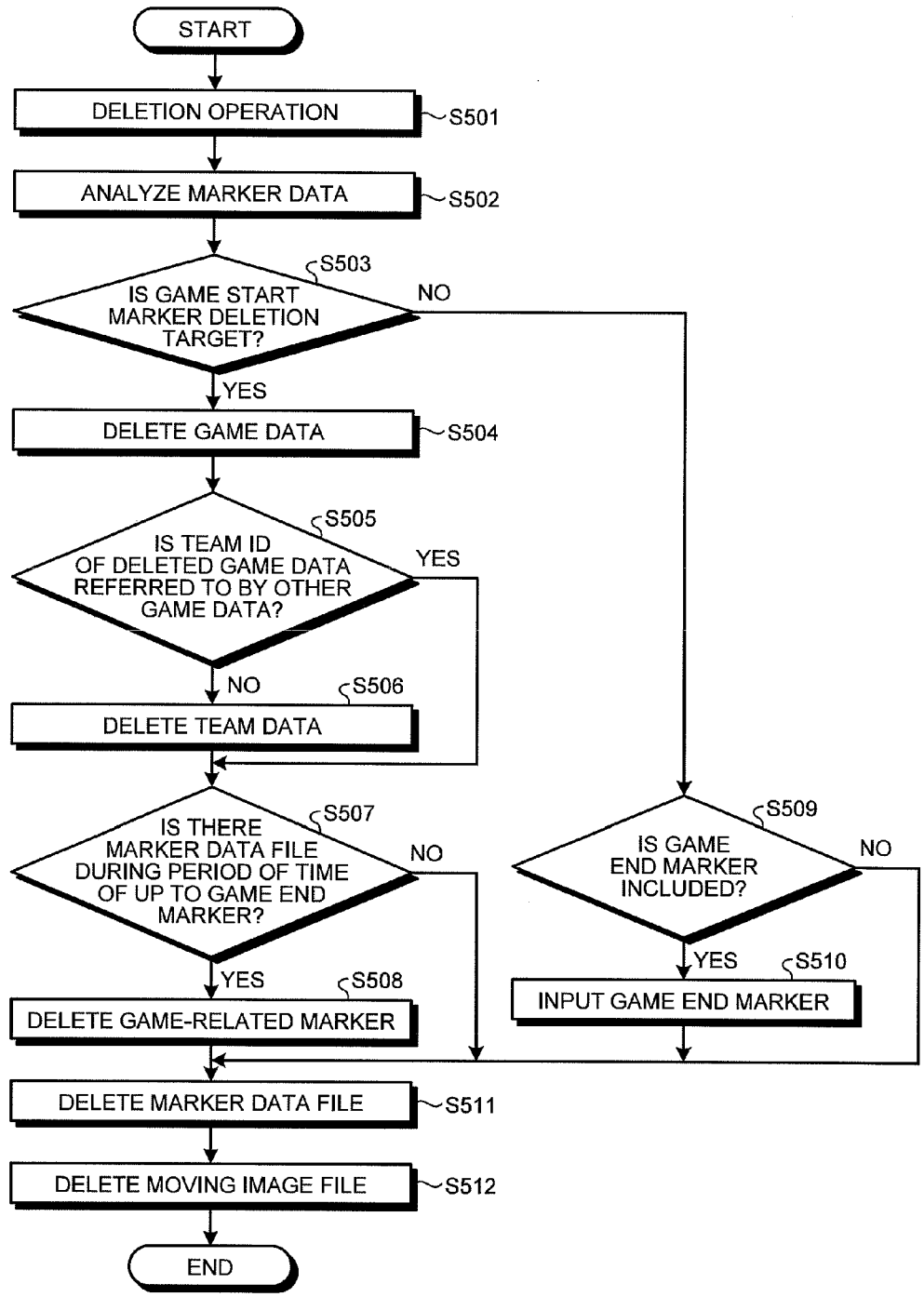
FIG. 17 is a flowchart illustrating a deletion operation according to the first embodiment.

Next, a moving image deletion process operation will be described. Moving image deletion means that a moving image file stored in the card type recording medium 302 is deleted. FIG. 17 is a flowchart illustrating a moving image deletion process. First of all, the user selects a moving image file to be deleted using the operating unit 306, and performs a deletion operation. Through this operation, the imaging device 1 starts the deletion operation of the selected moving image file (step S501).

Next, the marker data managing unit 402 analyzes a marker data file (hereinafter, referred to as a "deletion target marker data file") associated with a moving image file to be deleted (step S502). Specifically, the marker data managing unit 402 searches whether the game start marker data and the game end marker data are included in the deletion target marker data file.

When it is determined that the game start marker data is included in the deletion target marker data file (Yes in step S503), the game data managing unit 404 deletes game data related to a game serving as a deletion target from the game data file (step S504).

Next, the team table managing unit 403 determines whether a team ID referred by the deleted game data is referred to by other game data which is not deleted (step S505).

When it is determined that the team ID referred by the deleted game data is not referred to by the other game data which is not deleted (No in step S505), the team table managing unit 403 deletes team data corresponding to the non-referred team ID from the team table (step S506). However, when it is determined that the team ID referred by the deleted game data is referred to by the other game data which is not deleted (Yes in step S505), the team data is not deleted, and the process proceeds to the next step.

Next, the marker data managing unit 402 determines whether there is a marker data file which is not a deletion target marker data file during a period up to the game end marker corresponding to the game start marker (step S507). When it is determined that there is a marker data file which is not a deletion target marker data file (Yes in step S507), the marker data managing unit 402 deletes the game-related marker (the game end marker and the score marker) from the marker data file which is not the deletion target (step S508). However, when it is determined that there is no marker data file which is not a deletion target marker data file (No in step S507), the game-related marker deletion process is not performed.

Then, the marker data managing unit 402 deletes the deletion target marker data file (step S511). Lastly, the moving image file managing unit 401 deletes the moving image file of the deletion target (step S512).

Meanwhile, when it is determined that the game start marker data is not included in the deletion target marker data file (No in step S503), the marker data managing unit 402 determines whether the game end marker data is included in the deletion target marker data file (step S509).

When it is determined that the game end marker data is included in the deletion target marker data file (Yes in step S509), the marker data managing unit 402 inputs the game end marker to the end position (the end of the marker data file corresponding to moving image file) of the moving image file which includes a game but is not the deletion target (step S510). Then, the marker data managing unit 402 deletes the deletion target marker data file (step S511). Lastly, the moving image file managing unit 401 deletes the moving image file of the deletion target (step S512). Further, when it is determined that the game end marker data is not included in the deletion target marker data file (No in step S509), the game end marker is not input.

As the copy process and the deletion process are performed together, moving image movement (copying a moving image file to the copy destination without any remained moving image file in the copy source) can be also realized.

Further, even when a single game is recorded throughout a plurality of moving image files, the marker data managing unit 402 may cause a total point (a total score) in the immediately previous marker data file to be stored in the head of the marker data file when generating the marker data file. Through this operation, even when some of a plurality of moving image files in which a single game is recorded and some marker data files are deleted, the other marker data files store a total score of each team until then. Thus, the marker data managing unit 402 can refer to a total score of each team when the marker data file is generated.

Further, the marker data file stores a score added to the total score of the immediately previous marker data file as well. In other words, the added score is the sum of scores acquired by each team in the corresponding marker data file.

For example, in the immediately previous marker data file, a total score of an A team is assumed to be 35, and a total score of a B team is assumed to be 41. Further, in the current marker data file, the A team is assumed to have acquired 11 points, and the B team is assumed to have acquired 15 points. In this case, the current marker data file stores information (the total score of up to the immediately previous marker data file) representing that the total score of the A team in the immediately previous marker data file is 35 points, and the total score of the B team is 41 points and information (a score added to the total score of the immediately previous marker data file) representing that the A team has acquired 11 points, and the B team has acquired 15 points. Through this operation, when the total score is recalculated after some of a plurality of moving image files in which a single game is recorded are deleted, it is possible to calculate the total score using the added score in each marker data file and the total score. As a result, it is unnecessary to calculate with reference to all added scores, and thus a load of an operation process of the imaging device 1 can be reduced.

Moving Image Trimming

Figure 18:
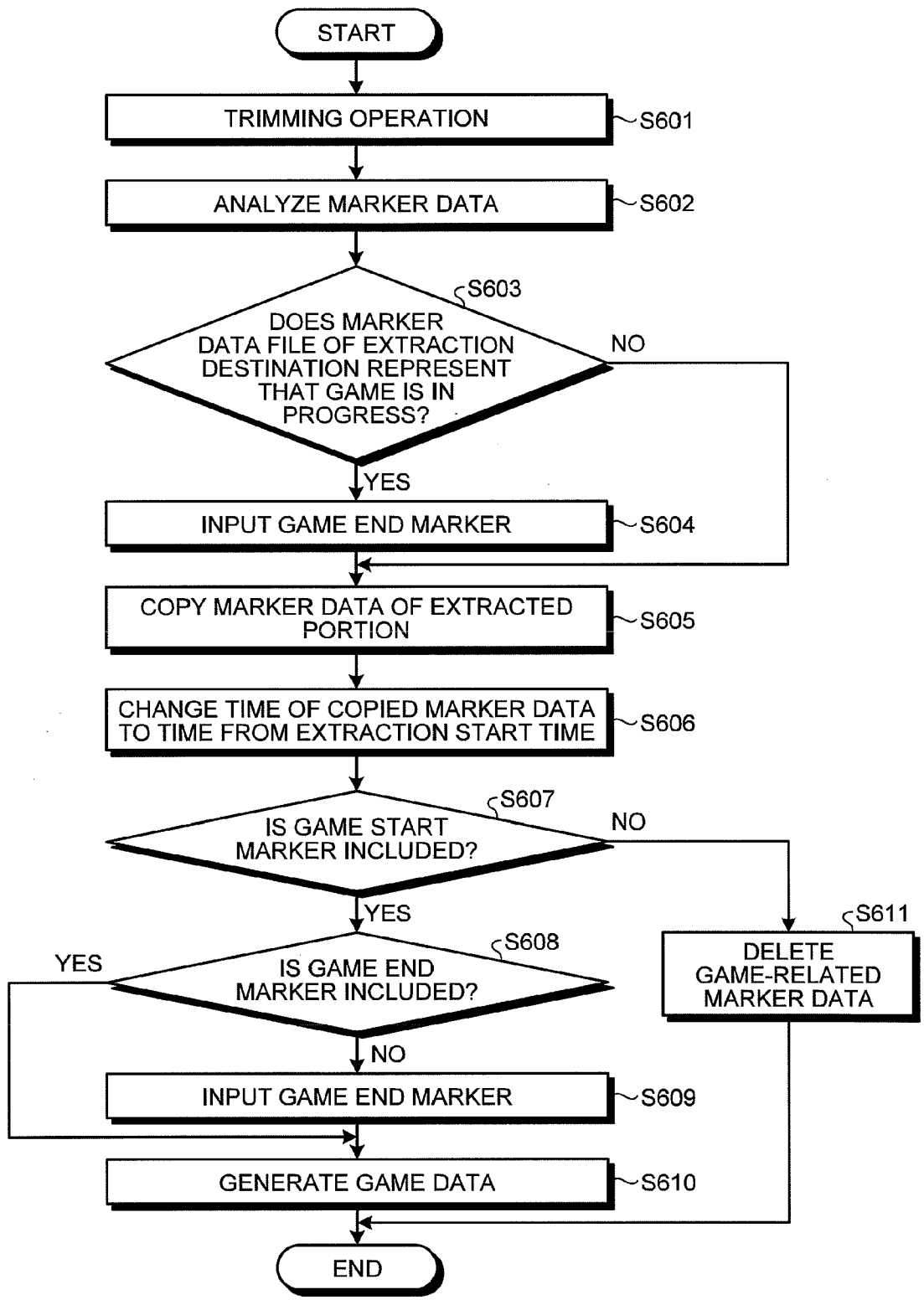
FIG. 18 is a flowchart illustrating a trimming operation according to the first embodiment.

Next, a moving image trimming process operation will be described. Moving image trimming means a process of deleting moving image data prior or subsequent to a range (for example, a range from a start of a game to an end thereof) designated by the user in a moving image file. Through this process, moving image data prior to the game start marker and moving image data subsequent to the game end marker are deleted, and a moving image file corresponding to a range from a start of a game to an end thereof is extracted. FIG. 18 is a flowchart illustrating a moving image trimming process. First of all, the user designates a moving image file to be trimmed and an extraction range using the operating unit 306. Through this operation, the imaging device 1 starts the trimming operation on the extraction range of the designated moving image file (step S601). At this time, the moving image file managing unit 401 copies moving image data within the designated range of the designated moving image file to an extraction destination (a place in which a trimmed moving image file is stored such as another memory or an end of the designated moving image file).

Next, the marker data managing unit 402 analyzes marker data associated with the extracted moving image data and marker data prior or subsequent to the marker data (step S602). Specifically, the marker data managing unit 402 searches whether the game start marker data or the game end marker data is included in the marker data.

Further, the marker data managing unit 402 analyzes marker data (existing marker data) already stored in the extraction destination. Specifically, the marker data managing unit 402 determines whether the existing marker data of the extraction destination represents that a game is in progress (step S603). More specifically, the marker data managing unit 402 determines that the existing marker data file of the extraction destination includes the game start marker data but does not include the game end marker data.

When it is determined that the existing marker data file of the extraction destination represents that a game is in progress (Yes in step S603), the marker data managing unit 402 inputs the game end marker to the end of the existing marker data file (step S604). However, when it is determined that the existing marker data file of the extraction destination represents that a game is not in progress (No in step S603), the game end marker is not input, and the process proceeds to the next step.

Next, the marker data managing unit 402 copies marker data of the extracted portion (step S605). Then, the marker data managing unit 402 changes time information of each of the copied marker data (step S606). More specifically, the marker data managing unit 402 performs a process of changing a relative time (an intra-media time) from the moving image head to a relative time (a time when an extraction start time is counted as 0) from the extraction start time on each marker data.

Then, the marker data managing unit 402 determines whether the game start marker data is included in the marker data of the extracted portion (step S607). When it is determined that the game start marker data is included in the marker data of the extracted portion (Yes in step S607), the marker data managing unit 402 determines whether the game end marker data is included in the marker data of the extracted portion (step S608).

When it is determined that the game end marker data is not included in the marker data of the extracted portion (No in step S608), the marker data managing unit 402 inputs the game end marker to the end of the marker data of the extracted portion (step S609). Further, when it is determined that the game end marker data is included in the marker data of the extracted portion (Yes in step S609), the process of inputting the game end marker is not performed, and the process proceeds to the next step.

Lastly, the game data managing unit 404 generates game data based on the game start marker data included in the marker data of the extracted portion, and adds the generated game data to the game data file (step S610). In other words, the game data of the trimmed game is added to the game data file.

Meanwhile, when it is determined that the game start marker data is not included in the marker data of the extracted portion (No in step S607), the marker data managing unit 402 deletes the game-related marker data (the game end marker data and the score marker data) included in the marker data of the extracted portion (step S611).

As described above, according to the configuration of the imaging device 1 according to the first embodiment, the card type recording medium 302 divides imaged data of a single game (event) into a plurality of moving image files and stores the plurality of moving image files. For this reason, a single game is recorded throughout a plurality of moving image files. Further, the marker data managing unit 402 stores the marker data including the input game start marker and game end marker in the card type recording medium 302 as a plurality of marker data files in association with the plurality of moving image files. Thus, a start and an end of a game recorded throughout a plurality of moving image files can be easily searched with reference to the game start marker and the game end marker, and thus a moving image file can be easily managed.

Second Embodiment

A second embodiment according to the present invention will be described. In an imaging device 2 according to the second embodiment, various types of markers can be input using a mobile terminal device 3 connected to the imaging device 2. A configuration of the imaging device 2 is the same as that of the imaging device 1, and thus a description thereof will be appropriately omitted.

Figure 19:
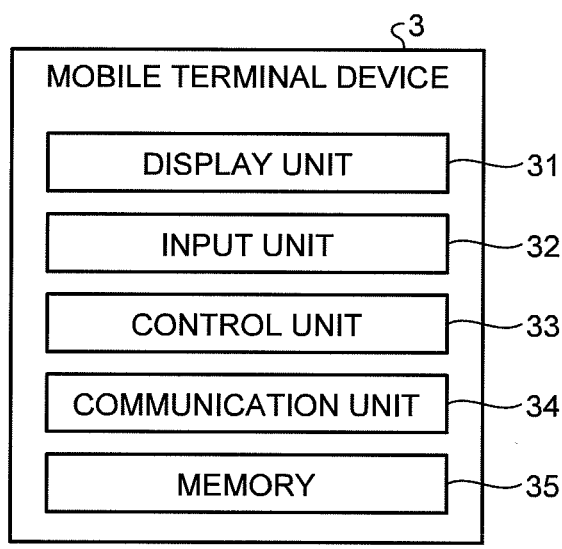
FIG. 19 is a block diagram illustrating a configuration of a mobile terminal device according to a second embodiment.

A configuration of the mobile terminal device 3 according to the second embodiment will be described. FIG. 19 is a block diagram of the mobile terminal device 3. The mobile terminal device 3 includes at least a display unit 31, an input unit 32, a control unit 33, a communication unit 34, and a memory 35.

Figure 20:
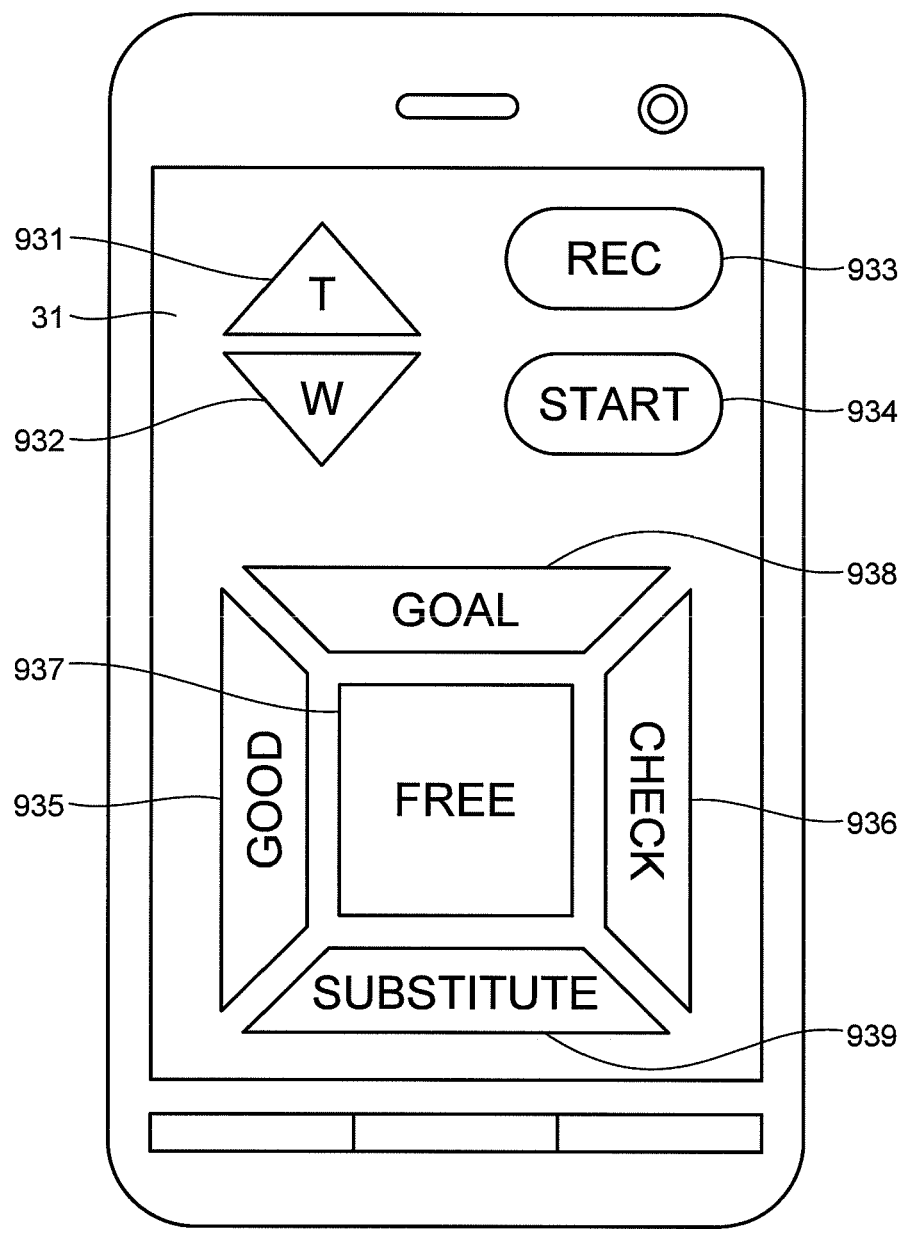
FIG. 20 is a diagram for describing an interface image according to the second embodiment.

Further, a marker input application is assumed to be downloaded to the mobile terminal device 3 in advance. The application includes a user interface (UI) image used to input a marker or the like. FIG. 20 illustrates an exemplary UI image displayed on the display unit 31 of the mobile terminal device 3. The mobile terminal device 3 includes a tele icon 931, a wide icon 932, a recording-start/recording-stop icon 933, a game start marker icon 934, a good marker icon 935, a check marker icon 936, a free marker icon 937, a score marker icon 938, and a player substitution marker icon 939 as an UI image.

Figure 21:
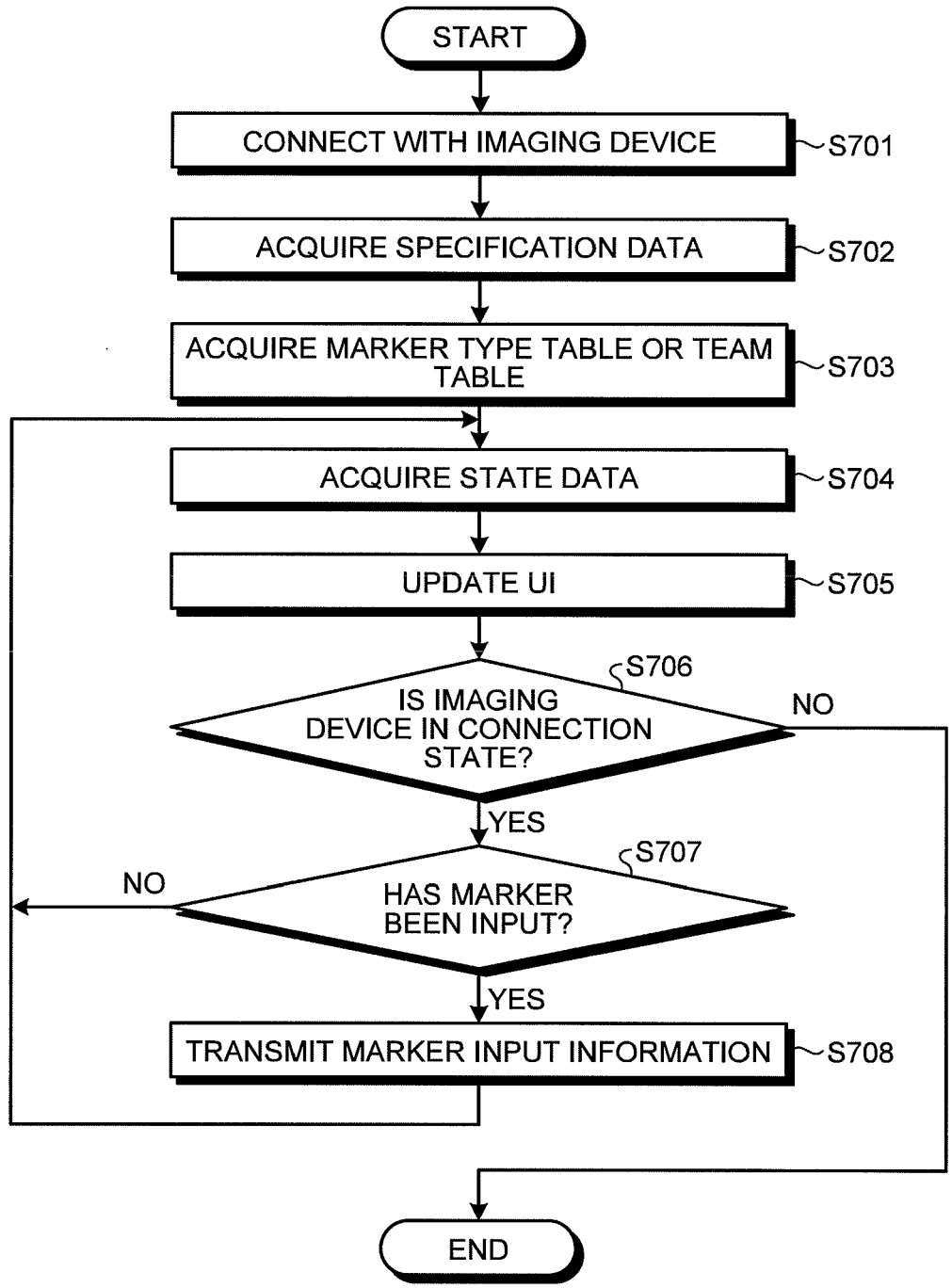
FIG. 21 is a flowchart illustrating an operation of a mobile terminal device according to the second embodiment.

Next, a process of inputting a marker using the mobile terminal device 3 will be described. FIG. 21 is a flowchart illustrating a process of inputting a marker using the mobile terminal device 3. First of all, the mobile terminal device 3 is connected with the imaging device 2 using the communication unit 34 (step S701). Further, the imaging device 2 can be connected with the mobile terminal device 3 using wireless communication such as Bluetooth (a registered trademark) or Wi-Fi direct. Of course, the imaging device 2 may be connected with the mobile terminal device 3 using wired communication.

Next, the control unit 33 acquires specification data from the imaging device 2 (step S702). Then, the control unit 33 stores the acquired specification data in the memory 35. Here, the specification data is information related to a specification of a marker input application such as a uniform resource identifier (URI) of a default marker type table, a URI of a default team table, and a marker input interval. Further, the marker input interval is a minimum period of time taken until a next marker can be input after a certain marker is input.

The control unit 33 acquires the marker type table or the team table from the imaging device 2 with reference to the URI included in the specification data (step S703). Further, when the type of a marker is fixed, the marker type table may be included in an application which is downloaded by the mobile terminal device 3.

Next, the control unit 33 acquires state data (step S704). Here, the state data is information representing a state related to an interface image and a marker in the imaging device 2. Examples of the state data include "whether game is in progress", "team name", "team color", "score display", "enable/disable of marker input button", "enable/disable of game start marker input button", "enable/disable of game end marker input button", "enable/disable of score marker input button", and "enable/disable of UNDO button". Upon acquiring the state data, the control unit 33 stores the state data in the memory 35.

Then, the control unit 33 updates the display unit 31 and the input unit 32 based on the acquired state data (step S705). For example, the control unit 33 updates a score on the display screen or changes a score button of the input unit 32 from an enable state to a disable state. In other words, the UI image of the mobile terminal device 3 is updated.

When the update is completed, the control unit 33 determines whether the imaging device 2 is currently in the connection state with the mobile terminal device 3 (step S706). When it is determined that the connection between the imaging device 2 and the mobile terminal device 3 has already ended (No in step S706), the mobile terminal device 3 ends the marker input operation.

However, when it is determined that the imaging device 2 is in the connection state with the mobile terminal device 3 (Yes in step S706), the control unit 33 determines whether the user has input a marker using the input unit 32 (the UI image illustrated in FIG. 20) (step S707).

When it is determined that the marker input operation has not been performed (No in step S707), the control unit 33 acquires the state data from the imaging device 2 again (step S704). In other words, the control unit 33 updates the state data. When there is a change in the state data, the change in the state data is reflected in the mobile terminal device 3 through the update of the UI image (step S705). Further, the control unit 33 acquires (updates) the state data in step S704 with a frequency of once per 5 seconds.

Meanwhile, when it is determined that the marker input operation has been performed (Yes in step S707), the control unit 33 transmits marker input information representing that a marker has been input to the imaging device 2 for the input marker (step S708).

Upon receiving the marker input information, the imaging device 2 inputs a marker corresponding to the marker input information. Then, the imaging device 2 updates the state data.

The control unit 33 acquires the state data changed according to transmission of the marker input information (step S704). Then, the control unit 33 performs the UI update (step S705), and reflects the change in the state data in the mobile terminal device 3. The mobile terminal device 3 repeats the above operation until the connection with the imaging device 2 ends.

As described above, according to the configuration of the imaging device 2 according to the second embodiment, a marker can be input using the mobile terminal device 3. Thus, even when the user is at a place remote from the imaging device 2, a marker can be input. As a result, the position of the user is not restricted, and convenience is improved.

Third Embodiment

A third embodiment according to the present invention will be described. In the third embodiment, similarly to the second embodiment, the user operates a mobile terminal device to operate an imaging device and input a marker. A configuration of the imaging device is the same as in the second embodiment, and a description thereof will be appropriately omitted.

Further, a configuration of a mobile terminal device 4 according to the third embodiment is similar to the block diagram of the mobile terminal device 3 illustrated in FIG. 19. However, the mobile terminal device 4 according to the third embodiment is different from the mobile terminal device 3 in the UI image. Further, the mobile terminal device 4 includes a measuring unit (for example, a stop watch function unit) for measuring a time. The mobile terminal device 4 is connected with the imaging device through a wireless communication line or a wired communication line.

Figure 22:
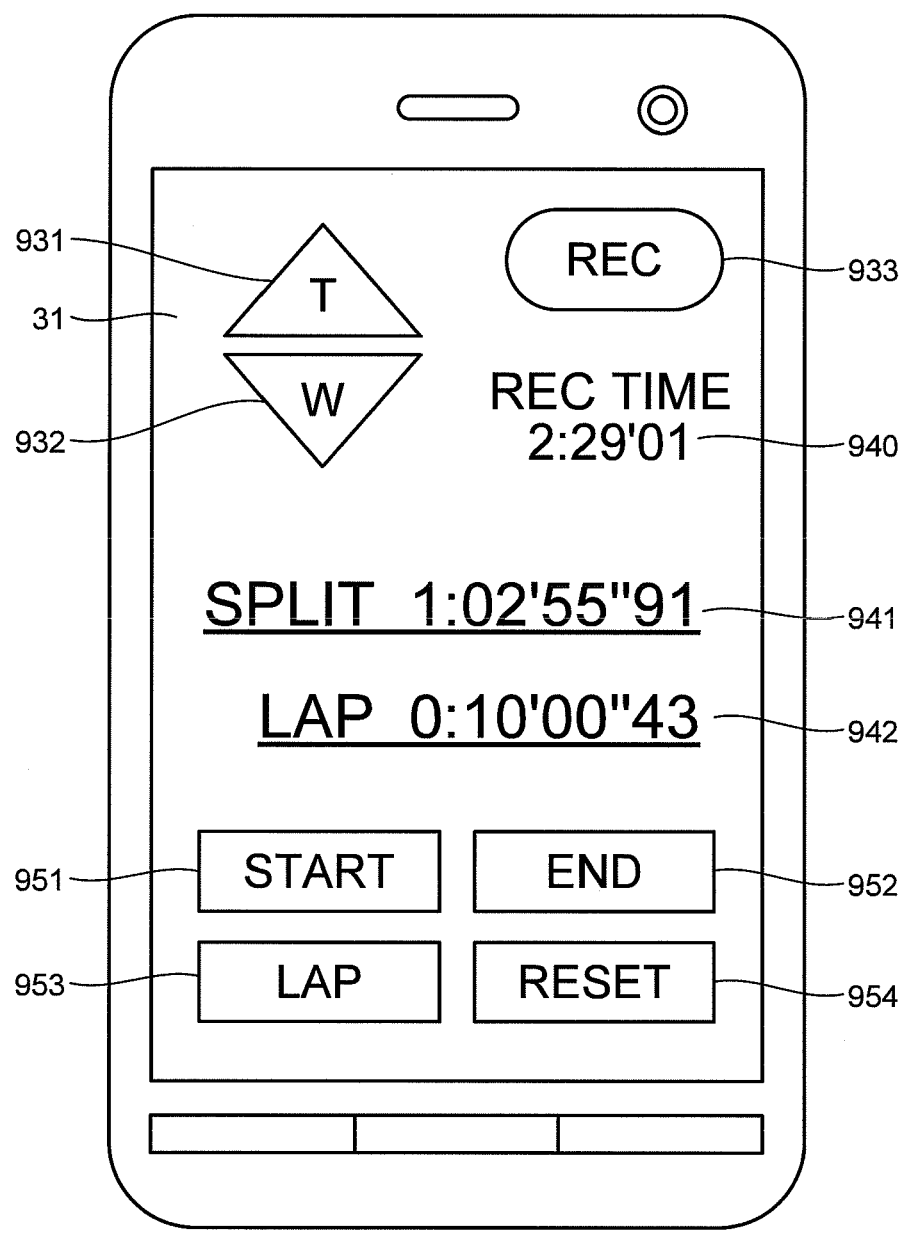
FIG. 22 is a diagram for describing an interface image according to a third embodiment.

FIG. 22 illustrates an exemplary UI image displayed on the display unit 31 of the mobile terminal device 4. The mobile terminal device 4, as an UI image, includes a measurement start marker icon 951, a measurement end marker icon 952, a lap marker icon 953, and a reset icon 954 in addition to the tele icon 931, the wide icon 932, and the recording start/recording stop icon 933. Further, a recording time 940, a split time 941, and a lap time 942 are displayed on the display unit 31.

The UI of the mobile terminal device 4 according to the third embodiment is specialized in race sports (long-distance running or motor sports) in which players run a course. Specifically, the UI of the mobile terminal device 4 has a stop watch function, and can measure a split time representing a time elapsed from a start and a lap time representing a single lap time of a course.

The recording time 940 represents a time that has elapsed since recording started. In other words, the recording time 940 is a time that has elapsed since the recording start/recording stop icon 933 was touched. In the example illustrated in FIG. 22, the recording time 940 represents that 2 hours, 29 minutes, and 1 second has elapsed since recording started.

The split time 941 represents a time that has elapsed since the measurement start marker icon 951 was touched (since a race started). In the example illustrated in FIG. 22, the split time 941 represents that 1 hour, 2 minutes, and 91 seconds has elapsed since the race started.

The lap time 942 represents a time that has elapsed since the lap marker icon 953 was touched immediately before. In other words, the lap time 942 is a time that has elapsed since running started, and means a single lap time of a course. In the example illustrated in FIG. 22, the lap time 942 represents 10 minutes and 0.43 seconds has elapsed. In the case of the first lap, a time that has elapsed since the measurement start marker icon 951 was touched is the lap time 942. In other words, in the case of the first lap, the split time 941 is the same as the lap time 942.

The measurement start marker icon 951 is an icon used to cause measurement of a race to start. When the measurement start marker icon 951 is touched, measurement of the split time 941 and the lap time 942 starts. Further, the measurement start marker icon 951 corresponds to the game start marker icon in the first and second embodiments. When the measurement start marker icon 951 is touched, the communication unit 34 (transmitting unit) of the mobile terminal device 4 transmits a marker input instruction representing that a marker has been input to the imaging device. Upon receiving the marker input instruction, the wireless module 309 (receiving unit) of the imaging device inputs a marker corresponding to the marker input instruction. In other words, the imaging device generates marker data such that the intra-media time at which the measurement start marker is input (a time elapsed since recording of a moving image started) is associated with the marker ID of the measurement start marker.

The measurement end marker icon 952 is an icon used to end measurement of a race. When the measurement end marker icon 952 is touched, the measurement of the split time 941 and the lap time 942 ends.

The lap marker icon 953 is an icon used to measure a lap time. When the lap marker icon 953 is touched, the lap time 942 being measured stops, and a time taken until a runner or the like completes a single lap is displayed on the lap time 942. When the lap marker icon 953 is touched, the lap time 942 being measured stops, and measurement of a lap time of a next lap starts. Further, when the lap marker icon 953 is touched, the split time 941 being measured is displayed. In other words, when the lap marker icon 953 is touched, split time (a time elapsed from a start at the time of each lap) and a lap time (a time elapsed from a previous lap at the time of each lap) at that point in time are displayed. At this time, for the split time 941 and the lap time 942, a time being measured in a current lap may be displayed when a predetermined time elapses after a measured time is displayed. Alternatively, the mobile terminal device 4 may display a past history of the split time 941 and the lap time 942 on an arbitrary area of the display unit 31 in the form of a list without stopping a display of a time being measured.

When the measurement end marker icon 952 or the lap marker icon 953 is touched, a marker is input, similarly to the measurement start marker icon 951 described above. Specifically, the mobile terminal device 4 transmits the split time and the lap time at that time to the imaging device together with the input instruction of the measurement end marker or the lap marker. Then, the imaging device generates marker data such that the measurement end marker or the lap marker (the marker ID), the split time, the lap time, and the intra-media time (a time elapsed from a start of moving image recording) at which a marker is input are associated with one another. Further, the measurement end marker is a marker representing that a player passes through a finish line. Further, the lap marker is a marker representing that a player passes through a predetermined point (a goal (start) position in the case of a course race).

The reset icon 954 is an icon used to reset a display of the split time 941 and the lap time 942.

Figures 23, 24:
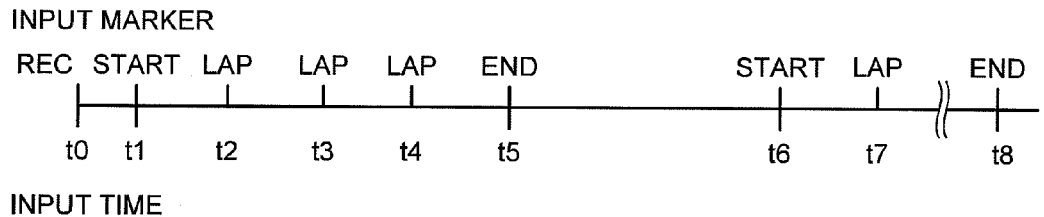
FIG. 23 is a diagram for describing a marker input operation according to the third embodiment.
FIG. 24 illustrates a marker data file according to the third embodiment.

Next, operations of the imaging device and the mobile terminal device 4 according to the third embodiment will be described. First of all, a marker input operation will be described. FIG. 23 is a diagram illustrating marker input timings in time series. FIG. 24 is a diagram illustrating a marker data file of markers input at the timing illustrated in FIG. 23. Further, similarly to the above-described first and second embodiments, the marker data file is stored in, for example, the card type recording medium 302 (storage unit).

First, the user touches the recording start/recording stop icon 933 of the mobile terminal device 4, and instructs the imaging device to start recording as illustrated in FIG. 23. As a result, the imaging device starts recording (a time t0).

Next, when preparation of a race is completed, the user touches the measurement start marker icon 951 of the mobile terminal device 4 along with the start of the race (a time t1). As a result, measurement of the split time 941 and the lap time 942 starts. Further, as the measurement start marker icon 951 is touched, the mobile terminal device 4 transmits a measurement start marker input instruction to the imaging device. Then, the imaging device generates marker data such that the measurement start marker is associated with the input time t1, and stores the marker data in the marker data file. In FIG. 24, the measurement start marker corresponds to the marker ID 10. Further, an input time of a marker may be a time inside the mobile terminal device 4 when the marker icon is touched or may be a time inside the imaging device when the imaging device receives the marker input instruction.

Next, when a runner has taken a lap around a course, the user touches the lap marker icon 953 (a time t2). Through this operation, a time at which a first lap is completed is displayed on the mobile terminal device 4 as the split time 941 and the lap time 942. Further, as the lap marker icon 953 is touched, the mobile terminal device 4 transmits a lap marker input instruction to the imaging device. Further, the mobile terminal device 4 transmits the measured split time and the lap time to the imaging device together with the lap marker input instruction.

The imaging device generates marker data such that the lap marker, the time t2, the split time, and the lap time are associated with one another, and stores the generated marker data in the marker data file. In FIG. 24, the lap marker corresponds to the marker ID 11.

Thereafter, also at times t3 and t4, similarly to the time t2, the imaging device generates marker data such that an input time of a marker, a split time, a lap time, and a lap marker are associated with one another, and stores the generated marker data in the marker data file.

Then, when the runner completes a last lap of a race (passes through a finish line), the user touches the measurement end marker icon 952 (a time t5). Through this operation, a time from the start to the finish line is displayed on the mobile terminal device 4 as the split time 941. A time of a last lap is displayed on the mobile terminal device 4 as the lap time 942.

Further, as the measurement end marker icon 952 is touched, the imaging device is given a measurement end marker input instruction. Further, the mobile terminal device 4 transmits the measured split time and the lap time to the imaging device together with the measurement end marker input instruction.

The imaging device generates marker data such that the measurement end marker, the time t5, the split time, and the lap time are associated with one another, and stores the marker data in the marker data file. In FIG. 24, the measurement end marker corresponds to the marker ID 20.

Thereafter, a break is taken until a time t6, and at the time t6, the user touches the measurement start marker icon 951 of the mobile terminal device 4 along with the start of a second lap of a race (the time t6). Through this operation, measurement of the split time 941 and the lap time 942 is started. Thereafter, similarly to the times t2 to t5, the user operates the mobile terminal device 4, and the imaging device generates the marker data file according to the operation. Through this process, the marker data file illustrated in FIG. 24 is generated.

Figure 25:
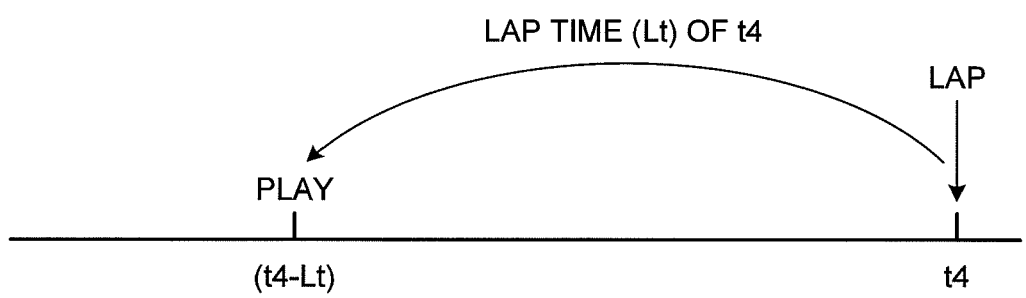
FIG. 25 is a diagram for describing a playback operation according to the third embodiment.
Figure 26:
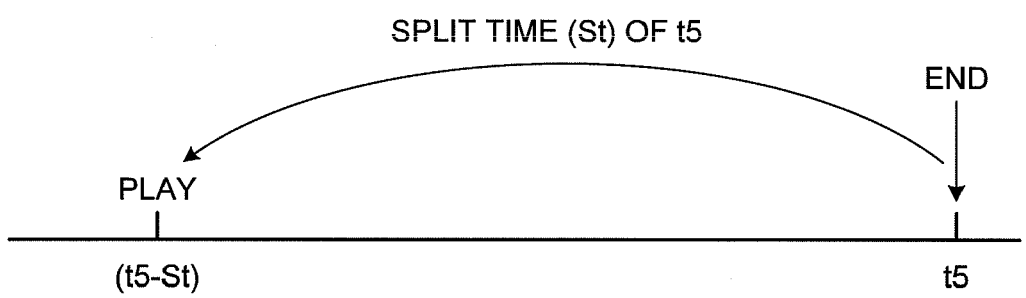
FIG. 26 is a diagram for describing a playback operation according to the third embodiment.

Next, a playback operation of the imaging device will be described with reference to FIGS. 25 and 26. The imaging device displays the "LAP TIME" field of the marker data file illustrated in FIG. 24 on the liquid crystal monitor 304 in the form of a list. Then, the user selects a lap time at which a playback is desired to be performed using the operating unit 306.

The imaging device plays back the moving image based on a time at which the lap marker or the measurement end marker associated with the selected lap time is input. For example, when the lap time "0:10'07"42" of the "LAP TIME" is selected, the moving image file managing unit 401 (playback unit) plays back the moving image from a point in time that is traced back from the time t4 by the lap time (Lt) rather than the time t4 at which the lap marker associated with the lap time has been input as illustrated in FIG. 25. In other words, the moving image is played back from a time obtained by subtracting the lap time (607420 ms) from the time t4 (1908675 ms). Through this operation, the moving image is played back from a start of a lap in which the selected lap time is obtained.

Similarly, the imaging device displays the "SPLIT TIME" field on the liquid crystal monitor 304 in the form of a list in a screen which is the same as or different from that of the "LAP TIME" field. Then, the user selects a split time at which a playback is desired to be performed.

The imaging device plays back the moving image based on a time at which the lap marker or the measurement end marker associated with the selected split time has been input. For example, the moving image file managing unit 401 plays back the moving image from a point in time that is traced back from the time t5 by the split time (St) rather than the time t5 at which the measurement end marker associated with the selected split time has been input as illustrated in FIG. 26. In other words, the moving image is played back from a time obtained by subtracting the split time (2410950 ms) from the time t5 (2513147 ms). Through this operation, the moving image is played back from a start of a race in which the selected split time is obtained.

Further, when time measurement is performed from a start of the race but recording starts in the middle of the race, a moving image may not be present at the position traced back by the split time. In this case, the moving image file managing unit 401 plays back the moving image from the recording start position (the beginning of the moving image).

As described above, according to the configuration of the imaging device according to the third embodiment, when the marker playback instruction is received, the moving image file managing unit 401 plays back the moving image from the position which is traced back from the input time of the marker by time information (the lap time or the split time) associated with the marker. Thus, when a time is selected, the moving image can be played back from the start position of the race in which the time is obtained or the lap start position. Further, even when a marker is not input at the time of race start or at the time of lap start, a playback can be performed from an appropriate position traced back by the split time or the lap time.

Fourth Embodiment

Figure 27:
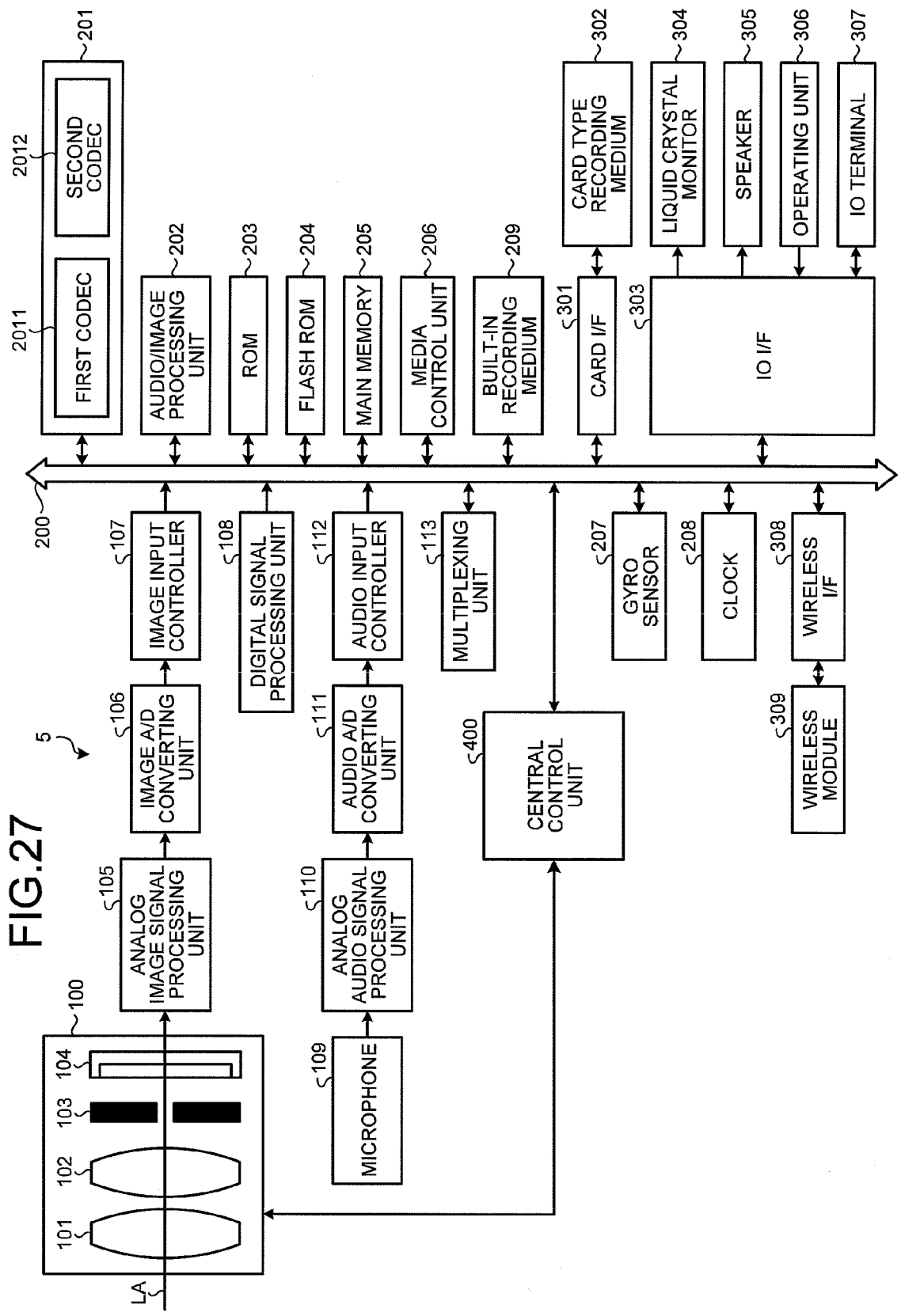
FIG. 27 is a block diagram illustrating a configuration of an imaging device according to a fourth embodiment.

A fourth embodiment according to the present invention will be described. FIG. 27 is a block diagram of an imaging device 5 according to the fourth embodiment. According to the imaging device 5 illustrated in FIG. 27, a compression/decompression processing unit 201 includes a first codec 2011 and a second codec 2012. In other words, the compression/decompression processing unit 201 according to the fourth embodiment includes a dual codec. The remaining configuration is the same as in the imaging device 1 illustrated in FIG. 2, and a description thereof will be appropriately omitted.

Further, the imaging device 5 according to the fourth embodiment transmits a captured video to a live delivery system. Specifically, the imaging device 5 encodes video for live delivery using the first codec 2011, and encodes video for recording using a second codec. In other words, the imaging device 5 delivers video while performing recording.

The first codec 2011 compresses imaged data and digital audio data stored in the main memory 205 based on a compression method conforming to the MPEG2 standard or the AVC/H.264 standard, and generates compression data. At this time, the first codec 2011 encodes image data of a marker input using the imaging device 5 or mobile terminal device to be superimposed on imaged data, and generates transmission video (a first moving image file). Then, the first codec 2011 transmits the generated transmission video to an external live delivery system (external server) (not illustrated) through the wireless module 309. Further, the type of a marker according to the fourth embodiment is not particularly limited as long as the marker represents a state of specifying an event serving as an imaging target. For example, the marker (for example, the game start marker, the game end marker, the measurement start marker, the measurement end marker, the good marker, the check marker, or the score marker) in the first to third embodiments may be used as a marker.

The second codec 2012 compresses imaged data and digital audio data stored in the main memory 205 based on a compression method conforming to the MPEG2 standard or the AVC/H.264 standard, and generates compression data, similarly to the first codec 2011. However, the second codec 2012 does not cause image data of a marker input using the imaging device 5 or mobile terminal device to be superimposed on imaged data. In other words, the second codec 2012 encodes only the imaged data and the digital audio data and generates a moving image file (a second moving image file). The marker data managing unit 402 (control unit) generates marker data such that an intra-media time when a marker is input is associated with a marker ID of an input marker. Then, the marker data managing unit 402 stores the generated marker data in the card type recording medium 302 as a marker data file in association with the moving image file (second moving image file).

Further, the type of a marker according to the fourth embodiment is not particularly limited as long as the marker represents a state (for example, a game start, a game end, a measurement start, a measurement end, when there is a good play, when confirmation is required, or when a score is made) of specifying an event serving as an imaging target. For example, the marker (for example, the game start marker, the game end marker, the measurement start marker, the measurement end marker, the good marker, the check marker, or the score marker) in the above embodiment may be used as the marker.

Figure 28:
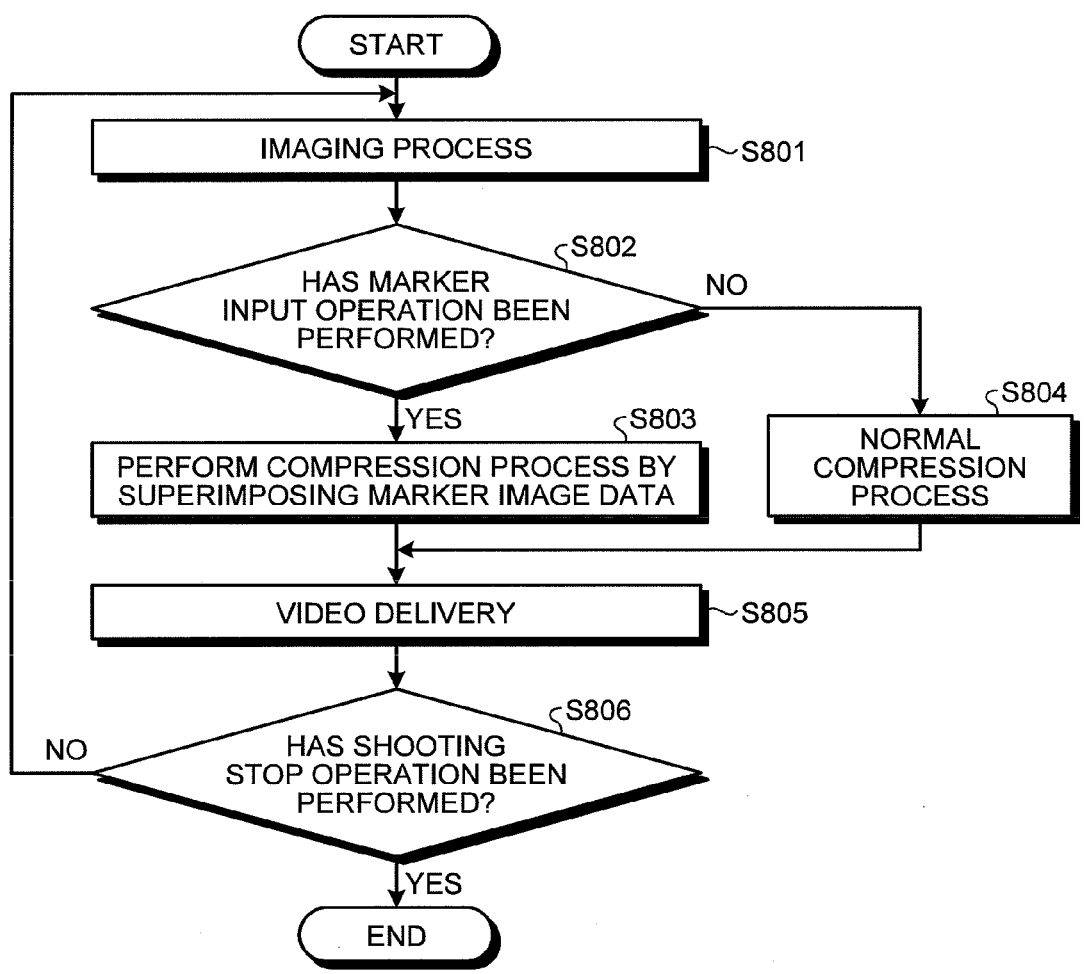
FIG. 28 is a flowchart illustrating an operation of a first codec according to the fourth embodiment.
Figure 29:
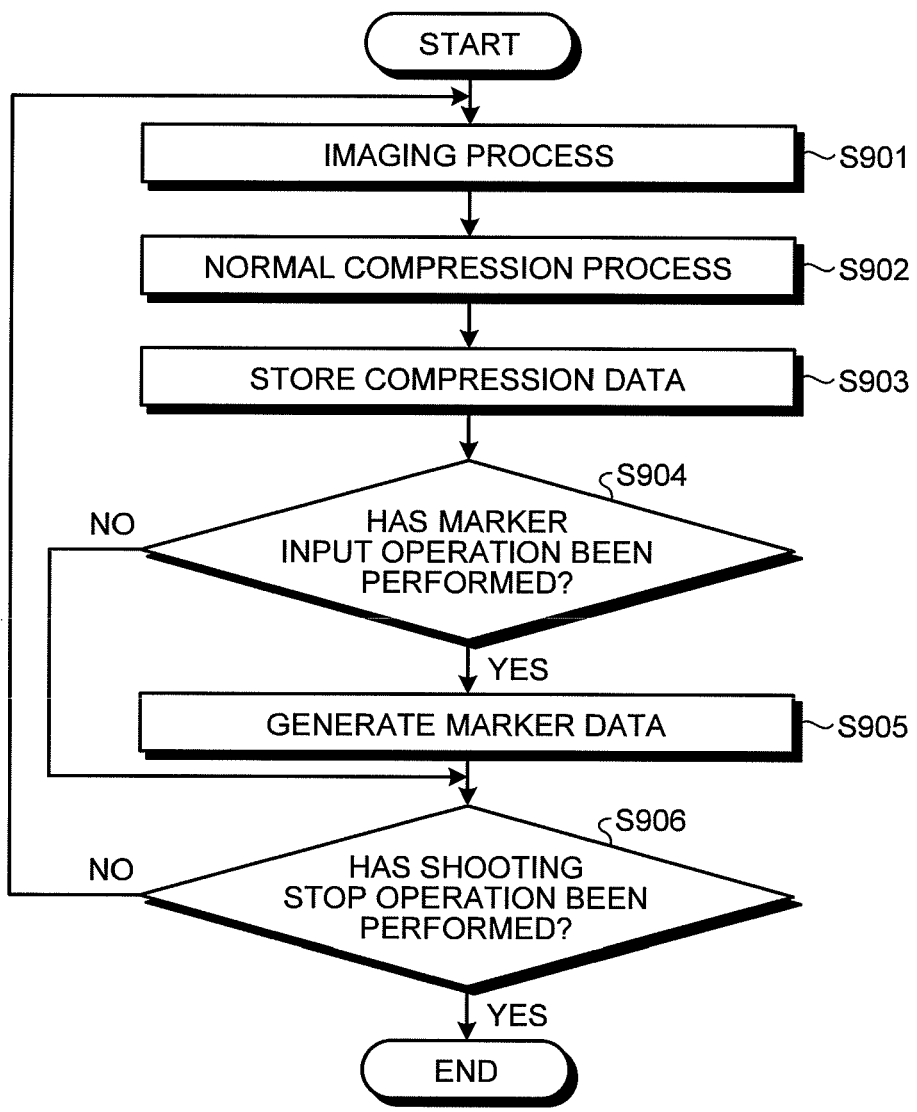
FIG. 29 is a flowchart illustrating an operation of a second codec according to the fourth embodiment.

Next, an operation of the imaging device 5 according to the fourth embodiment will be described with reference to flowcharts illustrated in FIGS. 28 and 29. The flowchart indicated in FIG. 28 illustrates an operation of the first codec 2011. The flowchart indicated in FIG. 29 illustrates an operation of the second codec 2012.

First, an operation of the first codec 2011 will be described. First of all, the imaging unit 100 performs an imaging process (step S801). Through this process, imaged data is generated.

Next, the marker data managing unit 402 determines whether a marker has been input using the operating unit 306 of the imaging device 5 or mobile terminal device (step S802). When it is determined that a marker has been input (Yes in step S802), the marker data managing unit 402 transmits maker image data corresponding to the input marker to the first codec 2011. For example, the marker image data is stored in the flash ROM 204 in advance.

Then, the first codec 2011 generates compression data such that the marker image data is superimposed on the imaged data (step S803). Meanwhile, when it is determined that no marker has been input (step S804), the first codec 2011 generates compression data using only the imaged data and digital audio data (step S805). In other words, the first codec 2011 performs a normal encoding process.

Next, the first codec 2011 transmits the compression data (first moving image file) to the live delivery system. Through this process, the video imaged by the imaging device 5 is delivered (step S805). At this time, when a marker has been input, video on which marker image data is superimposed is delivered.

Then, the central control unit 400 determines whether the user has performed a shooting stop operation (step S806). When it is determined that the shooting stop operation has been performed (Yes in step S806), the imaging device 5 ends shooting. However, when it is determined that the shooting stop operation has not been performed (No in step S806), the process returns to step S801, and the above operation is repeated.

Next, an operation of the second codec 2012 will be described. First of all, the imaging unit 100 performs an imaging process (step S901). Through this process, imaged data is generated.

Next, the second codec 2012 compresses only the imaged data and digital audio data, and generates compression data (second moving image file) (step S902). In other words, the second codec 2012 performs a normal encoding process regardless of whether a marker has been input. Then, the second codec 2012 stores the generated compression data in the card type recording medium 302 as a moving image file (step S903).

Further, the marker data managing unit 402 determines whether a marker has been input using the operating unit 306 of the imaging device 5 or the mobile terminal device (step S904). When it is determined that a marker has been input (Yes in step S904), the marker data managing unit 402 generates marker data such that an input time of a marker is associated with a marker ID, and stores the generated marker data in the card type recording medium 302 as a marker data file in association with the moving image file compressed by the second codec 2012 (step S905). However, when it is determined that no marker has been input (No in step S904), marker data is not generated, and the process proceeds to step S906.

Then, the central control unit 400 determines whether the user has performed the shooting stop operation (step S906). When it is determined that the shooting stop operation has been performed (Yes in step S906), the imaging device 5 ends shooting. However, when it is determined that no shooting stop operation has been performed (No in step S906), the process returns to step S901, and the above operation is repeated.

Further, for the sake of convenience, the operation of the first codec 2011 and the operation of the second codec 2012 have been described using the separate flowcharts (FIGS. 28 and 29), and the flows illustrated in FIGS. 28 and 29 are performed in parallel. In other words, the compression/decompression processing unit 201 performs the compression in the first codec 2011 and the compression in the second codec 2012 in parallel.

As described above, according to the configuration of the imaging device 5 according to the fourth embodiment, the first codec 2011 generates compression data such that input marker image data is superimposed on imaged data. Then, the first codec 2011 transmits video on which marker image data is superimposed to a delivery system. Meanwhile, the second codec 2012 generates compression data using imaged data without superimposing marker image data, and stores the generated compression data in the card type recording medium 302. Thus, even when the delivery system side does not have a function of superimposing marker image data, video on which marker image data is superimposed can be delivered. Further, since the card type recording medium 302 stores normal video on which marker image data is not superimposed, it is possible to view video on which marker image data is not displayed or to edit the video.

In the above example, video with a marker image superimposed thereon is transmitted to a delivery system without being stored in memory or the like, but a superimposed video may be stored in, for example, the card type recording medium 302. Thus, even a playback device having no function of superimposing an image can play back video with an image superimposed thereon after.

Further, the marker data managing unit 402 may detect whether a marker data file stored in association with a moving image file generated by the second codec 2012 has been edited. When marker data has been edited, the marker data managing unit 402 transmits the edited marker data to the first codec 2011. The first codec 2011 causes the edited marker image data to be superimposed on a moving image file (no marker superimposing) stored in the card type recording medium 302. Through this operation, the imaging device 5 can generate video with an edited marker image superimposed thereon.

Fifth Embodiment

A fifth embodiment according to the present invention will be described. Japanese Laid-open Patent Publication No. 2008-5010 discloses a moving image edit method capable of adding a caption to a moving image with tag information. Further, a caption is a sentence for describing content of a moving image such as the lyrics or a subtitle. When a marker is input while a moving image is being shot, the user cannot input a marker at a desired timing since he/she focuses on shooting or views of a subject. For this reason, there is a problem in that when an input marker is displayed, the maker is not displayed at a desired timing in the moving image.

In this regard, the imaging device according to the fifth embodiment displays a marker input during shooting at an appropriate timing. A feature of the imaging device according to the fifth embodiment lies in a marker display timing during a playback of a moving image and processing when a marker is input during a playback of a moving image. Further, a configuration of the imaging device according to the fifth embodiment is the same as the configuration of the above described imaging device 1, and thus a description thereof will be appropriately omitted.

Configuration of Central Control Unit 400

Figure 30:
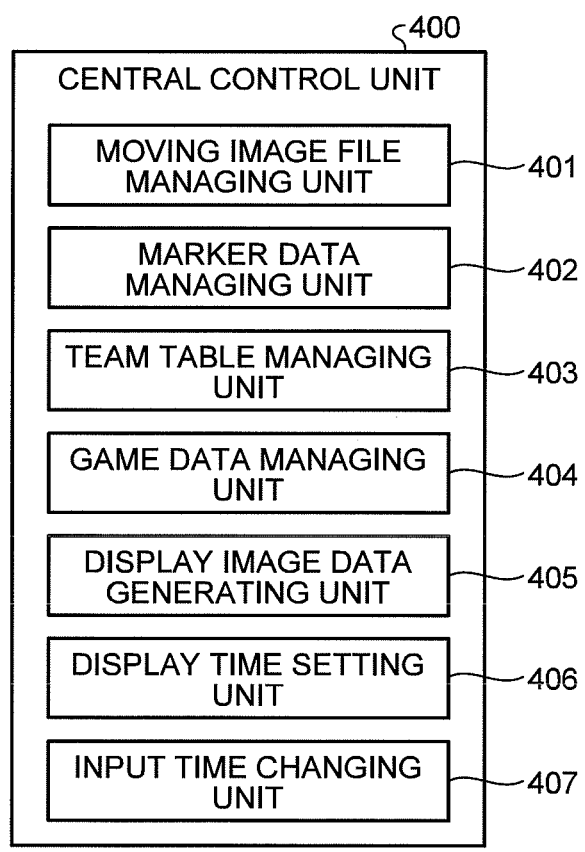
FIG. 30 is a block diagram illustrating a configuration of a central control unit according to a fifth embodiment.

FIG. 30 is a block diagram of the central control unit 400 of the imaging device. The central control unit 400 includes a display time setting unit 406 and an input time changing unit 407 in addition to the configuration illustrated in FIG. 8. The remaining configuration is the same as the central control unit 400 described with reference to FIG. 8, and thus a description thereof will be appropriately omitted.

The display time setting unit 406 sets display time information of a marker to a timing different from a timing represented by input time information of a marker. Here, the display time information is information representing a timing (a display time) at which a marker is displayed in a moving image file. The display image data generating unit 405 generates display image data used to display a moving image together with a marker based on the set display time information. In other words, the display image data generating unit 405 generates display image data in which a marker is superimposed on a moving image at a time (timing) different from an input time associated with a marker.

At this time, an amount of a deviation (difference) between a display time and an input time can be appropriately set by the user. In other words, a time by which a display time is earlier (or later) than an input time can be adjusted by the user. Here, an amount of a deviation of a display time of a marker relative to an input time of a marker is referred to as an adjustment amount.

Figure 31:
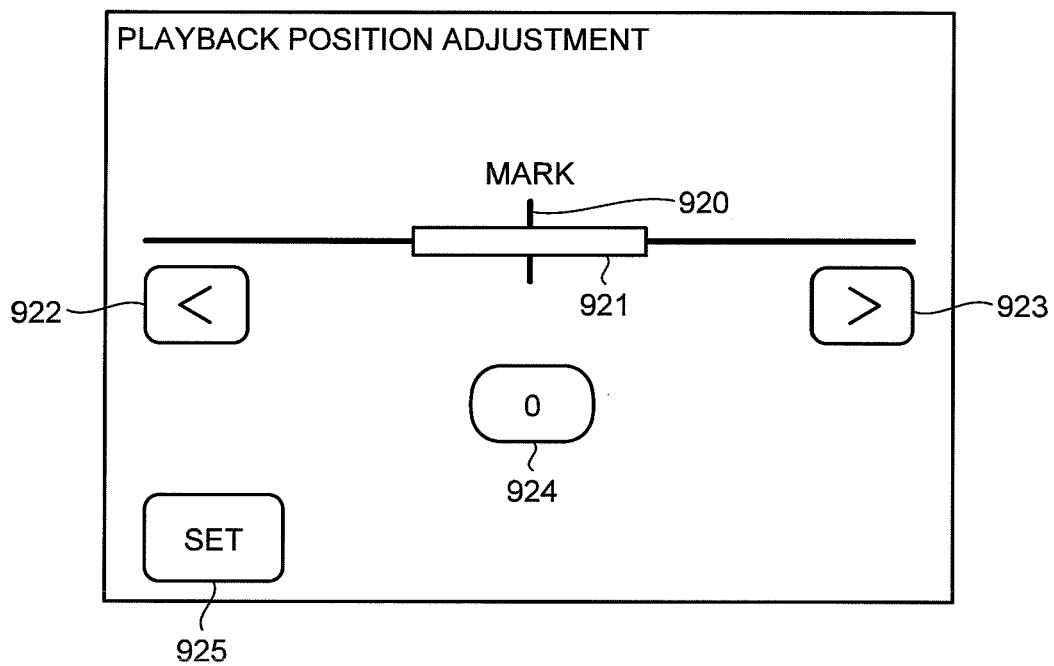
FIG. 31 is a diagram for describing an interface image according to the fifth embodiment.

FIG. 31 illustrates an exemplary interface image used for the user to change the adjustment amount. An interface image illustrated in FIG. 31 includes: a MARK 920 which is a scale representing an input time of a marker; a mark 921 representing a deviation of a display time relative to the MARK 920; icons 922 and 923 used to adjust a display time; an icon 924 representing an adjustment amount; and an icon 925 used to adjust an adjustment amount being displayed. Further, the display time setting unit 406 sets a display time of a marker so as to be earlier according to the number of times or a time that the user touches the icon 922. Meanwhile, the display time setting unit 406 sets a display time of a marker so as to be later according to the number of times or a time that the user touches the icon 923.

Figure 32:
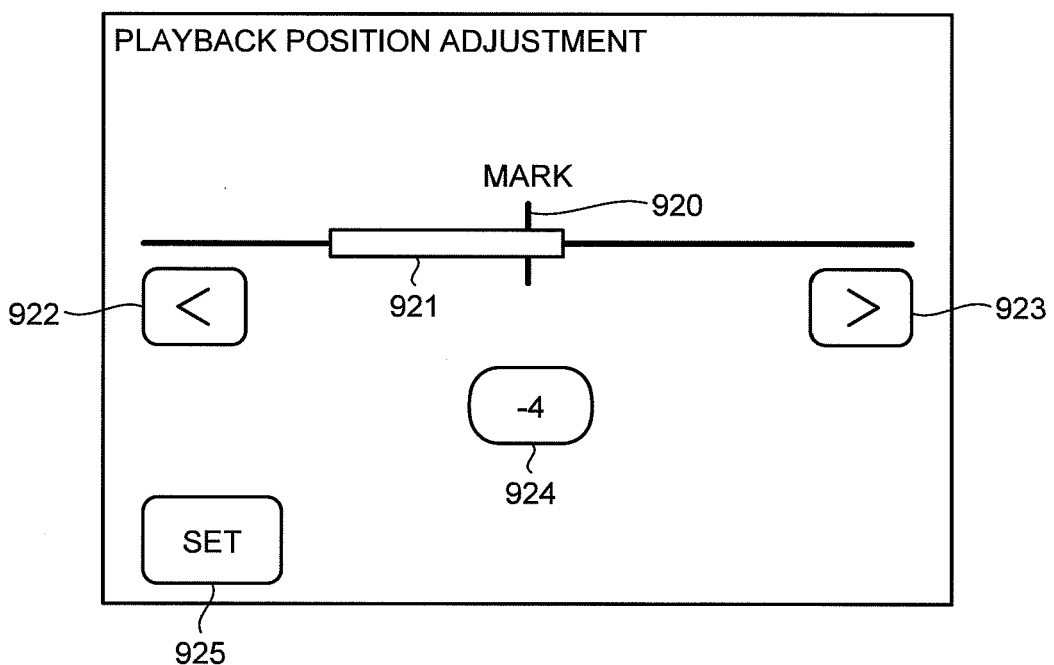
FIG. 32 is a diagram for describing an interface image according to the fifth embodiment.

For example, when the user operates the icon 922 and pushes a display time forwards by 4 seconds compared to an input time, the interface image changes as illustrated in FIG. 32. Specifically, the mark 921 moves in the left direction (negative direction). Further, the adjustment amount displayed on the icon 924 becomes "−4."

When a marker is input to a moving image being played back through the operating unit 306; the input time changing unit 407 makes a timing at which input of the user is received earlier or later and generates input time information. In other words, the input time changing unit 407 changes an input time of a marker to a time which is earlier or later than a time at which the user actually inputs a corresponding marker. The marker data managing unit 402 stores the input marker and the input time changed by the input time changing unit 407 in the card type recording medium 302 in association with each other. Further, the user can appropriately set a change amount in the input time by the input time changing unit 407, for example, using an interface image illustrated in FIG. 31.

Operation of Imaging Device

Subsequently, an operation of the imaging device according to the fifth embodiment will be described with reference to a flowchart illustrated in FIG. 33. Further, a basic flow of a moving image playback operation is similar to the flowchart illustrated in FIG. 15. First of all, as the user performs a playback operation using the operating unit 306, the imaging device 1 starts the moving image playback operation (step S1001).

Next, the marker data managing unit 402 reads in a marker data file associated with a moving image file which starts to be played back from the card type recording medium 302 (step S1002).

Then, the display time setting unit 406 sets a display time which is earlier or later than an input time associated with a marker input by the user according to an adjustment amount set by the user to a corresponding marker among markers included in the read marker data file (step S1003).

For example, the adjustment amount is assumed to be −4 seconds as illustrated in FIG. 32. At this time, when an input time of a certain marker is 1 minute and 20 seconds, the display time setting unit 406 sets a display time of a corresponding marker to 1 minute and 16 seconds.

Next, the moving image file managing unit 401 determines whether a playback of the moving image file has ended (step S1004). When it is determined that the playback has not ended (No in step S1004), the marker data managing unit 402 updates marker-related information (step S1005). Specifically, the marker data managing unit 402 acquires a playback time (intra-media time) of the moving image file, and updates marker-related information to be updated at the acquired time.

Then, the marker data managing unit 402 updates the marker-related information, and updates a display of the moving image when there is a marker to be displayed, changed, or deleted in the moving image being played back (step S1006).

At this time, when there is a marker to be displayed at a playback time of the moving image file as the marker-related information is updated, the display image data generating unit 405 generates display image data in which image data of a marker to be displayed is superimposed on moving image data being played back. Here, in the fifth embodiment, the display image data generating unit 405 causes marker image to be superimposed on moving image data based on the display time set by the display time setting unit 406. In other words, the display image data generating unit 405 causes image data of a corresponding marker to be superimposed on moving image data when a playback time of the moving image file becomes a display time of a marker.

Further, in the first embodiment, when there is a marker to be displayed at a playback time of a moving image file as the marker-related information is updated, the imaging device 1 causes the marker to be displayed on a moving image being played back. In other words, when a playback time of a moving image file becomes an input time stored in the marker data file, a marker associated with the input time is displayed. That is, an input time of a marker is used as a display time of a marker as is.

On the other hand, in the imaging device according to the fifth embodiment, an input time of a marker is different from a display time. For example, when the adjustment amount is −4 seconds and an input time of a certain marker is 1 minute and 20 seconds, a display time of the corresponding marker is 1 minute and 16 seconds as illustrated in FIG. 32. In other words, an input marker is displayed at a time which is 4 seconds earlier than a time at which the user has actually input the marker.

Thus, even when the user inputs a marker late, a marker can be displayed at an appropriate timing. Specifically, when a marker is input while a game is being shot, the user needs to input a marker while watching a game in real time. For this reason, the user focuses on shooting or pays attention to a shooting target. Further, it is difficult to predict an event (for example, a score scene) to which a marker needs to be input, and it is difficult to prepare for input of a score marker in advance. As a result, the user hastily inputs a score marker after a score is made. Thus, the user performs a marker input operation with a delay, and a score marker is likely to be input at a time later than a time at which a score is made. However, according to the configuration of the imaging device according to the fifth embodiment, a display time at which a marker is displayed on a moving image can be made to be earlier than an input time. As a result, a marker can be displayed at an appropriate timing.

Further, the display time setting unit 406 limits a marker, which is subjected to a process of making a display time earlier than an input time, to a marker manually input by the user during shooting. In other words, the display time setting unit 406 does not make a display time earlier than an input time for a marker which is input automatically (without the user's operation) even when the marker is input during shooting. In other words, similarly to the first embodiment, an input time of a marker is the same as a display time of a marker for an automatically input marker. It is because an operation delay does not occur for an automatically input marker, and thus a marker input timing is unlikely to be delayed.

Figure 33:
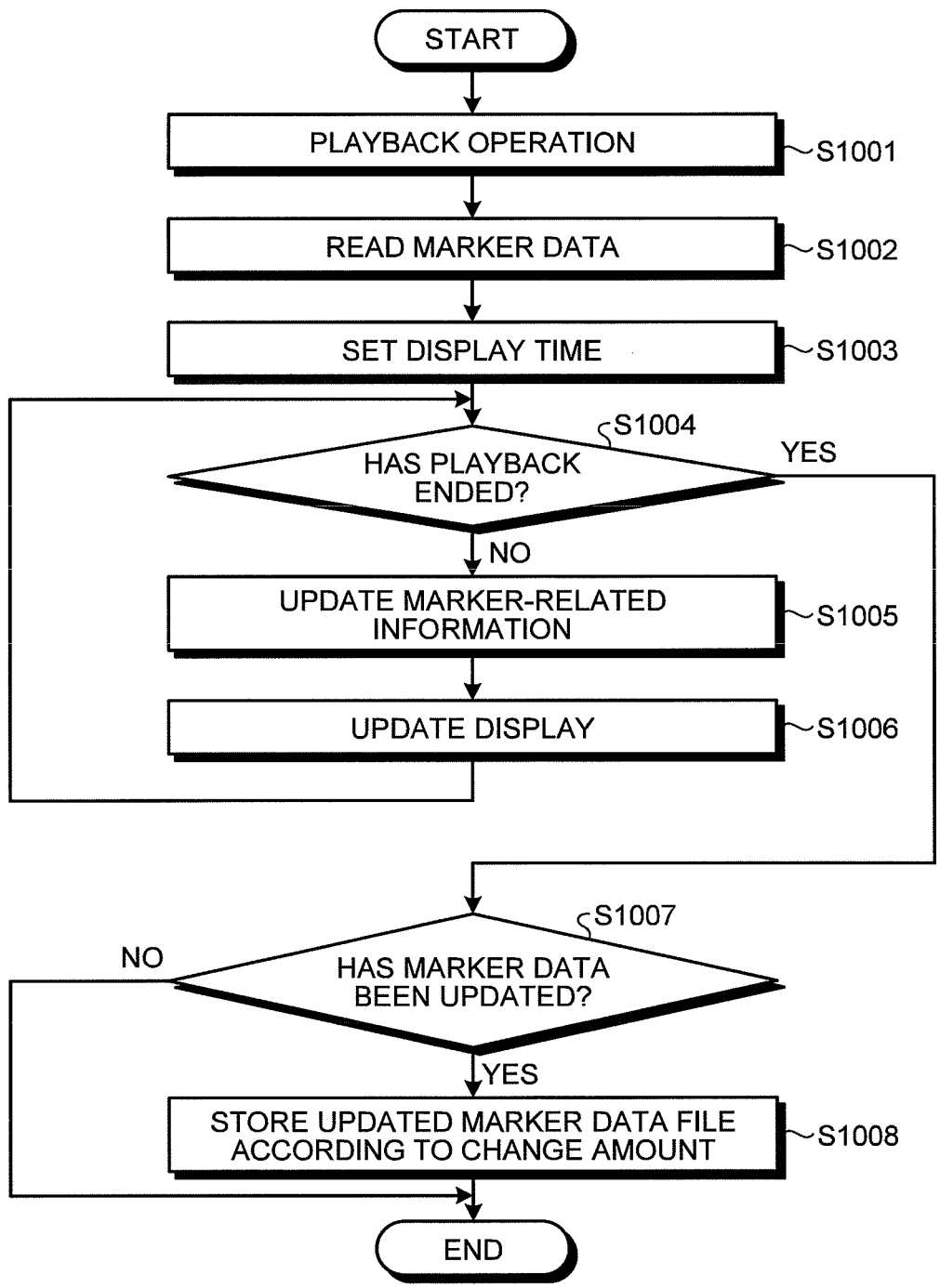
FIG. 33 is a flowchart illustrating an operation of an imaging device according to the fifth embodiment.

Referring back to the flowchart of FIG. 33, the moving image file managing unit 401 determines again whether the playback has ended (step S1004). When it is determined that the playback has not ended yet (No in step S1004), the marker data managing unit 402 updates the marker-related information again (step S1005). In other words, until the playback ends, the update of the marker-related information (step S1005) and the display update (step S1006) are performed at regular intervals (for example, at intervals of 500 ms).

When it is determined that the playback has ended (Yes in step S1004); the marker data managing unit 402 determines whether a marker data file corresponding to the moving image file has been updated (added, deleted, or changed) during the playback of the moving image file (step S1007). When it is determined that the marker data file has not been updated (No in step S1007), the moving image playback operation ends.

However, when it is determined that the marker data file has been updated (Yes in step S1007), the marker data managing unit 402 stores the updated marker data file in the card type recording medium 302 in association with the played-back moving image file according to the change amount (step S1008).

At this time, in the imaging device according to the fifth embodiment, the input time changing unit 407 changes an input time of a marker. Specifically, the input time changing unit 407 generates a time delayed from a time at which a marker is input as an input time according to the change amount. Then, the marker data managing unit 402 generates marker data such that the input marker is associated with the input time changed by the input time changing unit 407. The marker data managing unit 402 adds the generated marker data to the marker data file, and stores the updated marker data file in the card type recording medium 302.

For example, an example in which the change amount is +4 seconds will be described. When the user inputs a score marker at a time of 1 minute and 16 seconds during a playback of a moving image, the input time changing unit 407 delays a time at which the score marker is input by 4 seconds, and sets the input time to 1 minute and 20 seconds. Then, the marker data managing unit 402 adds the score marker to the marker data file as marker data in association with the input time of 1 minute and 20 seconds. Through this operation, the marker data file is updated.

Further, the input time changing unit 407 can change an input time of a marker only when a marker is input during a playback of a moving image. It is because during a playback of a moving image, the user can input a marker at a desired timing because the user may already know about the content of a moving image (game) or using a rewind operation of a moving image. For this reason, a display time of a marker input during a playback of a moving image need not be made to be earlier than an input time. Thus, only for a marker input during a playback, it suffices to delay an input time according to the adjustment amount of the display time setting unit 406.

In other words, when a marker is input during shooting (during an imaging process), the user is likely to perform an operation with a delay as described above. For this reason, the input time changing unit 407 does not change an input time of a marker when the marker is input by the user's operation during shooting.

As described above, according to the configuration of the imaging device according to the fifth embodiment, the input time changing unit 407 delays an input time of a marker input to a moving image being played back. For this reason, an input time stored in a marker data file is a time later than a time at which a marker is actually input. However, in the imaging device according to the fifth embodiment, a time (display time) at which a marker is displayed is a time earlier than an input time stored in a marker data file as described above. In other words, a time by which an input time is made to be later through the input time change process performed by the input time changing unit 407 is offset by a time by which a display time is made to be earlier through the display time setting process performed by the display time setting unit 406. As a result, a marker input during a playback is displayed on a moving image at a time close to an input time.

At this time, it is desirable to make a setting so that the sum of the change amount of the input time changing unit 407 and the adjustment amount of the display time setting unit 406 is zero (0). Through this setting, a time by which an input time is made to be later is completely offset by a time by which a display time is made to be earlier, and a marker input during a playback is displayed on a moving image at an input time.

Further, the display time setting process performed by the display time setting unit 406 may be performed before the marker data reading process performed by the marker data managing unit 402. Similarly, the input time changing process performed by the input time changing unit 407 may be performed after the marker data managing unit 402 stores marker data in a marker data file.

Further, in the fifth embodiment, the present invention has been described in connection with the imaging device, but the present invention can be applied to a device (for example, an image processing device) having no imaging function. The image processing device appropriately receives imaged data from an imaging device capable of imaging a still image and a moving image. Then, the image processing device may perform the above-described process on the received imaged data.

Sixth Embodiment

A sixth embodiment according to the present invention will be described. A feature of an imaging device according to the sixth embodiment lies in a marker display timing during a playback of a moving image or processing when a marker is input during a playback of a moving image, similarly to the fifth embodiment. Further, a configuration of the imaging device according to the sixth embodiment and a configuration of the central control unit 400 are the same as the imaging device 1, and thus a description thereof will be appropriately omitted.

The display time setting unit 406 sets display time information of a marker to a timing different from a timing represented by input time information of a corresponding marker at the time of recording and at the time of a playback. Here, the display time information is information representing a timing (display time) at which a marker is displayed in a moving image file. The display image data generating unit 405 generates display image data used to display a moving image together with a marker based on the set display time information. In other words, the display image data generating unit 405 generates display image data in which a marker is superimposed on a moving image at a time (timing) different from an input time associated with the marker.

At this time, an amount of a deviation (difference) between a display time and an input time may be a constant amount or may be appropriately set by the user. In other words, a time by which a display time is earlier than an input time may be set to a predetermined amount or may be adjusted by the user. Here, an amount of a deviation of a display time of a marker relative to an input time of a marker is referred to as an adjustment amount.

For example, similarly to the fifth embodiment, when the user operates the icon 922 and pushes the display time forward by 4 seconds compared to the input time, the interface image changes as illustrated in FIG. 32. Specifically, the mark 921 moves in the left direction (negative direction). Further, the adjustment amount displayed on the icon 924 becomes "−4."

When a marker is input to a moving image being played back through the operating unit 306, the input time changing unit 407 sets an input time of a marker to a time at which the user has actually input the marker. It is because during a playback of a moving image, the user can input a marker at a desired timing using information of content of a moving image (game) or a rewind operation of a moving image. For this reason, a display time of a marker input during a playback of a moving image need not be made to be earlier than an input time. Thus, for a marker input during a playback, a time at which the user has actually input the marker is set.

Through this operation, even when the user inputs a marker with a delay during shooting, the marker can be displayed at an appropriate timing. Specifically, when a marker is input during shooting of a game; the user needs to input a marker while watching a game in real time. For this reason, the user may focus on shooting or pay attention to a shooting target. Further, it is difficult to predict an event (for example, a score scene) to which a marker needs to be input, and it is difficult to prepare for input of a score marker in advance. As a result, the user hastily inputs a score marker after a score is made. Thus, the user performs a marker input operation with a delay, and a score marker is likely to be input at a time later than a time at which a score is made.

Further, during a playback of a moving image, the user can input a marker at a desired timing because the user may already know about content of a moving image (game) or using a rewind operation of a moving image, and thus it is possible to set to a time at which the user has actually input the marker.

Further, the display time setting unit 406 does not make a display time earlier than an input time for a marker which is input automatically (without the user's operation) even when the marker is input during shooting. In other words, similarly to the first embodiment, an input time of a marker is the same as a display time of a marker for an automatically input marker. It is because an operation delay does not occur for an automatically input marker, and thus an input timing of a marker is unlikely to be delayed.

Operation of Imaging Device

Next, an operation of the imaging device according to the sixth embodiment will be described. Further, a basic flow of a moving image playback operation is similar to the flowchart illustrated in FIG. 15. However, in the sixth embodiment, display time information representing a timing at which a marker is displayed may be displayed at a time represented by input time information. It is because for all markers which are automatically input while a moving image is being shot or while a moving image is being played back, an input time is adjusted when a marker is input, and a side at which a marker is displayed need not perform an adjustment.

As described above, according to the configuration of the imaging device according to the sixth embodiment, for both a marker input while a moving image is being shot and a marker input while a moving image is being played back, a marker can be displayed on a moving image at an appropriate timing although the user does not particularly perform an adjustment during a playback.

Further, the description has been made in connection with the example in which an adjustment amount of a marker input during a playback of a moving image and automatically (without the user's operation) is set to "0" and a marker time is not adjusted, but a time of a marker input during a playback of a moving image and automatically (without the user's operation) may be set according to the user's usage state.

In the above description, since the user can input a marker at a desired timing using information about content of a moving image (game) or a rewind operation of a moving image during a playback of a moving image, a marker at the time of a playback of a moving image set to a time at which the user has actually input the marker is set to a time at which the user has actually input the marker, but such a setting may be changed according to circumstances.

When a marker is input at the time of a normal playback, an input time is closer to an actual marker input time than when the user inputs a marker with a delay during shooting, but when a marker is input while viewing video, a delay is also supposed to occur. However, when a slow playback or a pause is performed, a marker can be input while accurately reflecting a marker input time. Thus, a state of a playback is finely divided (a normal playback, a slow playback, and a pause), and an adjustment amount is set for each state of a playback. In other words, an adjustment amount is large for a normal playback, and an adjustment amount is small for a slow playback or a pause. Through this operation, a marker can be displayed on a moving image at an appropriate timing without any uncomfortable feeling. Instead of a setting of an adjustment amount according to a state, a mode for inputting a marker may be recorded as input state information together with input time information and changed and displayed when a marker is displayed.

Further, when a marker is input through the mobile terminal device, a marker is likely to be input with a delay due to influence of a communication delay compared to when a marker is input through the imaging device. In this regard, a communication delay may be predicted based on a connection method or a radio wave state, and an adjustment amount may be increased based on a prediction time. Alternatively, a prediction time may be recorded as input state information together with a marker, and during a playback of a moving image, a mark playback position may be displayed at a timing pushed forward by a time corresponding to the recorded communication delay. Through this operation, even when a marker input through the imaging device and a marker input through the mobile terminal device are present together, a marker can be displayed on a moving image at an appropriate timing although the user does not perform an adjustment at the time of a playback.

For example, part of information stored in the card type recording medium 302 may be stored in a storage device (for example, USB memory) removably mounted onto the imaging device 1. Further, the imaging device 1 may appropriately download information to be held in the card type recording medium 302 via a network. Further, at least part of information stored in the card type recording medium 302 may be stored in a storage unit (not illustrated) in the central control unit 400.

Further, arbitrary processes of the imaging device and the mobile terminal device may be implemented as a central processing unit (CPU) executes a computer program. In this case, the computer program may be stored in any one of various types of non-transitory computer readable media and supplied to a computer. The non-transitory computer readable medium includes various types of tangible storage media. Examples of the non-transitory computer readable media include a magnetic recording medium (for example, a flexible disk, a magnetic tape, or a hard disk drive), a magneto optical recording medium (for example, a magneto optical disk), a CD-read only memory (ROM), a CD-R, a CD-R/W, and semiconductor memory (for example, mask ROM, programmable ROM (PROM), erasable PROM (EPROM), flash ROM, or random access memory (RAM)). Further, the program may be provided to the computer through any one of various types of transitory computer readable media. Examples of the transitory computer readable media include an electric signal, an optical signal, and an electromagnetic wave. The transitory computer readable medium can supply a program to a computer through a wired communication path such as an electric wire or an optical fiber or a wireless communication path.

Further, in addition to the example in which as a computer executes a program for implementing the functions of the above embodiments, the functions of the above embodiments are implemented, an example in which the program implements the functions of the above embodiments together with an operating system (OS) or application software operating on a computer is also included as an embodiment of the present invention. Further, an example in which the functions of the above embodiments are implemented as all or part of processing of the program is performed by a function extension board inserted into a computer or a function extension unit connected to a computer is also included as an embodiment of the present invention.

According to the embodiments of the present invention, it is possible to provide an imaging device, an imaging method, and an imaging program, which are capable of easily managing a moving image file even when a single event is recorded throughout a plurality of moving image files.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device, comprising:
an imaged data storage unit that stores imaged data of a moving image obtained by an imaging process;
a marker storage unit that stores a marker displayed during a playback of the moving image in association with input time information representing a timing at which the marker is input by a user;
a display time setting unit that sets display time information representing a timing at which the marker is displayed to a timing earlier than the timing represented by the input time information; and
a display image data generating unit that generates display image data used to display the moving image together with the marker based on the display time information.

2. An image processing device, comprising:
an imaged data storage unit that stores imaged data of a moving image obtained by an imaging process;
a marker storage unit that stores a marker displayed during a playback of the moving image in association with input time information representing a timing at which the marker is input by a user;
a display time setting unit that sets display time information representing a timing at which the marker is displayed to a timing different from the timing represented by the input time information;
a display image data generating unit that generates display image data used to display the moving image together with the marker based on the display time information;
a marker input unit that inputs the marker to the moving image; and
an input time changing unit that generates the input time information by delaying a timing at which input of the user is received when the marker is input to the moving image being played back through the marker input unit,
wherein the marker storage unit stores the input time information generated by the input time changing unit in association with the input marker.

3. The image processing device according to claim 2, wherein the input time changing unit delays the timing at which the input of the user is received based on a change amount previously set by the user.

4. An image processing device, comprising:
an imaged data storage unit that stores imaged data of a moving image obtained by an imaging process;
a marker storage unit that stores a marker displayed during a playback of the moving image in association with input time information representing a timing at which the marker is input by a user;
a display time setting unit that sets display time information representing a timing at which the marker is displayed to a timing different from the timing represented by the input time information; and
a display image data generating unit that generates display image data used to display the moving image together with the marker based on the display time information,
wherein the display time setting unit sets the timing represented by the display time information based on an adjustment amount previously set by the user.

5. An imaging device, comprising:
an imaging unit that generates imaged data of a moving image through an imaging process;
an imaged data storage unit that stores the imaged data;
a marker storage unit that stores a marker displayed during a playback of the moving image in association with input time information representing a timing at which the marker is input by a user;
a display time setting unit that sets display time information representing a timing at which the marker is displayed to a timing earlier than the timing represented by the input time information; and
a display image data generating unit that generates display image data used to display the moving image together with the marker based on the display time information.

6. An image processing method, comprising:
storing imaged data of a moving image obtained by an imaging process in an imaged data storage unit;
storing a marker displayed during a playback of the moving image in a marker storage unit in association with input time information representing a timing at which the marker is input by a user;
setting display time information representing a timing at which the marker is displayed to a timing earlier than the timing represented by the input time information; and
generating display image data used to display the moving image together with the marker based on the display time information.

7. An imaging method, comprising:
generating imaged data of a moving image through an imaging process;
storing the imaged data in an imaged data storage unit;
storing a marker displayed during a playback of the moving image in a marker storage unit in association with input time information representing a timing at which the marker is input by a user;
setting display time information representing a timing at which the marker is displayed to a timing earlier than the timing represented by the input time information; and
generating display image data used to display the moving image together with the marker based on the display time information.

8. A computer program product comprising a non-transitory computer usable medium having a computer readable program that causes a computer to execute:
storing imaged data of a moving image obtained by an imaging process in an imaged data storage unit;
storing a marker displayed during a playback of the moving image in a marker storage unit in association with input time information representing a timing at which the marker is input by a user;
setting display time information representing a timing at which the marker is displayed to a timing earlier than the timing represented by the input time information; and
generating display image data used to display the moving image together with the marker based on the display time information.

* * * * *